(12) United States Patent
Shu et al.

(10) Patent No.: US 11,934,958 B2
(45) Date of Patent: Mar. 19, 2024

(54) COMPRESSING GENERATIVE ADVERSARIAL NEURAL NETWORKS

(71) Applicant: Adobe Inc., San Jose, CA (US)

(72) Inventors: Zhixin Shu, San Jose, CA (US); Zhe Lin, Fremont, CA (US); Yuchen Liu, Princeton, NJ (US); Yijun Li, Seattle, WA (US)

(73) Assignee: Adobe Inc., San Jose, CA (US)

( * ) Notice: Subject to any disclaimer, the term of this patent is extended or adjusted under 35 U.S.C. 154(b) by 602 days.

(21) Appl. No.: 17/147,912

(22) Filed: Jan. 13, 2021

(65) Prior Publication Data

US 2022/0222532 A1    Jul. 14, 2022

(51) Int. Cl.
```
G06N 3/08      (2023.01)
G06N 3/082     (2023.01)
G06N 3/084     (2023.01)
G06T 5/00      (2006.01)
G06T 5/40      (2006.01)
G06T 7/194     (2017.01)
```

(52) U.S. Cl.
CPC ............ *G06N 3/082* (2013.01); *G06N 3/084* (2013.01); *G06T 5/002* (2013.01); *G06T 5/004* (2013.01); *G06T 5/40* (2013.01); *G06T 7/194* (2017.01)

(58) Field of Classification Search
CPC ........ G06N 3/045; G06N 3/047; G06N 3/082; G06N 3/084; G06T 5/002; G06T 5/004; G06T 5/40; G06T 7/194
See application file for complete search history.

(56) References Cited

U.S. PATENT DOCUMENTS

2019/0251442 A1* 8/2019 Koivisto ................ G06N 3/045
2022/0351044 A1* 11/2022 Guo ....................... G06N 3/045

OTHER PUBLICATIONS

Wang et al., "GAN Slimming: All-in-One GAN Compression by A Unified Optimization Framework", Aug. 25, 2020, arXiv: 2008. 11062v1, pp. 1-19 (Year: 2020).*

(Continued)

*Primary Examiner* — Brent Johnston Hoover
(74) *Attorney, Agent, or Firm* — Keller Preece PLLC

(57) ABSTRACT

This disclosure describes one or more embodiments of systems, non-transitory computer-readable media, and methods that utilize channel pruning and knowledge distillation to generate a compact noise-to-image GAN. For example, the disclosed systems prune less informative channels via outgoing channel weights of the GAN. In some implementations, the disclosed systems further utilize content-aware pruning by utilizing a differentiable loss between an image generated by the GAN and a modified version of the image to identify sensitive channels within the GAN during channel pruning. In some embodiments, the disclosed systems utilize knowledge distillation to learn parameters for the pruned GAN to mimic a full-size GAN. In certain implementations, the disclosed systems utilize content-aware knowledge distillation by applying content masks on images generated by both the pruned GAN and its full-size counterpart to obtain knowledge distillation losses between the images for use in learning the parameters for the pruned GAN.

20 Claims, 11 Drawing Sheets

(56) References Cited

OTHER PUBLICATIONS

Li et al., "Semantic Relation Preserving Knowledge Distillation for Image-to-Image Translation", Nov. 13, 2020, ECCV 2020, LNCS 12371, pp. 648-663, hereinafter "Li". (Year: 2020).*
Aguinaldo et al., "Compressing GANs using Knowledge Distillation", Feb. 1, 2019, arXiv:1902.00159v1, pp. 1-10. (Year: 2019).*
Wang et al., "GAN-Knowledge Distillation for One-Stage Object Detection", Mar. 25, 2020, IEEE Access, vol. 8, pp. 60719-60727. (Year: 2020).*
Rameen Abdal, Yipeng Qin, and Peter Wonka. Image2stylegan: How to embed images into the stylegan latent space? In Proceedings of the IEEE international conference on computer vision, pp. 4432-4441, 2019.
Rameen Abdal, Yipeng Qin, and Peter Wonka. Image2stylegan++: How to edit the embedded images? In Proceedings of the IEEE/CVF Conference on Computer Vision and Pattern Recognition, pp. 8296-8305, 202.
Andrew Brock, Jeff Donahue, and Karen Simonyan. Large scale gan training for high fidelity natural image synthesis.arXiv preprint arXiv: 1809.11096, 201.
Maurice Frechet. Sur la distance de deux lois de probabilite. 'Comptes Rendus Hebdomadaires Des Seances De L Academie Des Sciences, 244(6):689-692, 1957.
Martin Heusel, Hubert Ramsauer, Thomas Unterthiner, Bernhard Nessler, and Sepp Hochreiter. Gans trained by a two time-scale update rule converge to a local nash equilibrium. InAdvances in neural information processing systems, pp. 6626-6637, 2017.
Hengyuan Hu, Rui Peng, Yu-Wing Tai, and Chi-Keung Tang. Network trimming: A data-driven neuron pruning approach towards efficient deep architectures.arXiv preprint arXiv:1607.03250, 2016.
Tero Karras, Samuli Laine, and Timo Aila. A style-based generator architecture for generative adversarial networks. In Proceedings of the IEEE conference on computer vision and pattern recognition, pp. 4401-4410, 2019.
Tero Karras, Samuli Laine, Miika Aittala, Janne Hellsten, Jaakko Lehtinen, and Timo Aila. Analyzing and improving the image quality of stylegan. In Proceedings of the IEEE/CVF Conference on Computer Vision and Pattern Recognition, pp. 8110-8119, 2020.
Dong C Liu and Jorge Nocedal. On the limited memory bfgs method for large scale optimization.Mathematical programming, 45(1-3):503-528, 1989.
Zhuang Liu, Jianguo Li, Zhiqiang Shen, Gao Huang, Shoumeng Yan, and Changshui Zhang. Learning efficient convolutional networks through network slimming. InProceedings of the IEEE International Conference on Computer Vision, pp. 2736-2744, 2017.
Jian-Hao Luo, Jianxin Wu, and Weiyao Lin. Thinet: A filter level pruning method for deep neural network compression. In Proceedings of the IEEE international conference on computer vision, pp. 5058-5066, 2017.
Han Shu, Yunhe Wang, Xu Jia, Kai Han, Hanting Chen, Chunjing Xu, Qi Tian, and Chang Xu. Co-evolutionary compression for unpaired image translation. In Proceedings of the IEEE International Conference on Computer Vision, pp. 3235-3244, 2019.
Christian Szegedy, Vincent Vanhoucke, Sergey Ioffe, Jon Shlens, and Zbigniew Wojna. Rethinking the inception architecture for computer vision. In Proceedings of the IEEE conference on computer vision and pattern recognition, pp. 2818-2826, 2016.
Richard Zhang, Phillip Isola, Alexei A Efros, Eli Shechtman, and Oliver Wang. The unreasonable effectiveness of deep features as a perceptual metric. In Proceedings of the IEEE conference on computer vision and pattern recognition, pp. 586-595, 2018.
R. Abdal et al., A Style-Based StyleFlow: Attribute-conditioned Exploration of StyleGAN-Generated Images using Conditional Continuous Normalizing Flows, arXiv:2008.02401, (2020).

* cited by examiner

COMPRESSING GENERATIVE ADVERSARIAL NEURAL NETWORKS

BACKGROUND

Recent years have seen an increase in hardware and software platforms that implement generative adversarial neural networks (GAN). In particular, noise-to-image GANs are increasingly leading the performance of various computer vision tasks such as image generating and image editing. Despite recent advancements, noise-to-image GANs often require large storage space, have high computational costs, and utilize a significant amount of memory. Accordingly, many conventional systems that utilize noise-to-image GANs have a number of shortcomings with regard to efficiently, flexibly, and accuracy.

For example, as just mentioned, noise-to-image GANs are often large in size and require a substantial amount of storage space to implement. Furthermore, partly due to the large and complex architecture of noise-to-image GANs, noise-to-image GANs also demand a great amount of processing resources and a significant amount of memory to operate. As a result, conventional systems often utilize an inefficient amount of computational resources and storage space to perform various tasks.

Furthermore, many conventional noise-to-image GANs are often inflexible. For example, due to inefficient computational resource requirements, noise-to-image GANs are often precluded from operating on mobile devices (such as smartphones and tablets). Accordingly, many conventional systems cannot utilize noise-to-image GANs to perform compute vision tasks on mobile devices locally. Furthermore, conventional systems oftentimes must forego the utilization of noise-to-image GANs in minor computer vision tasks (e.g., editing singular images) because of the costs associated with the substantial computational resource requirements. Additionally, the high demand of computational resources corresponding to noise-to-image GANs often preclude conventional systems from using the noise-to-image GANs in real-time (or near-real time) computer vision tasks.

In addition to being inefficient and inflexible, conventional systems are often inaccurate, particularly when implemented on mobile devices. For instance, conventional compression techniques utilized by conventional systems to compress noise-to-image GANs often result in generative models that are materially inaccurate compared to the original noise-to-image GANs. As such, many conventional compression techniques result in noise-to-image GANs with a noticeable decrease in performance.

Accordingly, these, along with additional problems and issues exist in existing solutions with respect to the technical field of noise-to-image GANs.

SUMMARY

This disclosure describes one or more embodiments of systems, non-transitory computer-readable media, and methods that solve one or more of the foregoing problems in addition to providing other benefits. In particular, the disclosed systems compress noise-to-image GANs utilizing channel pruning and knowledge distillation to generate a compact and efficient unconditional noise-to-image GAN that effectively performs like its full-size counterpart. For instance, the disclosed systems determine metrics to identify informative channels and leverage channel pruning to reduce the noise-to-image GAN's network complexity and size. In addition, in some embodiments, the disclosed systems utilize a knowledge distillation approach to learn parameters for the pruned GAN to effectively mimic a full-size noise-to-image GAN in tasks such as image generation and image editing.

BRIEF DESCRIPTION OF THE DRAWINGS

The detailed description is described with reference to the accompanying drawings in which.

DETAILED DESCRIPTION

Figure 1:
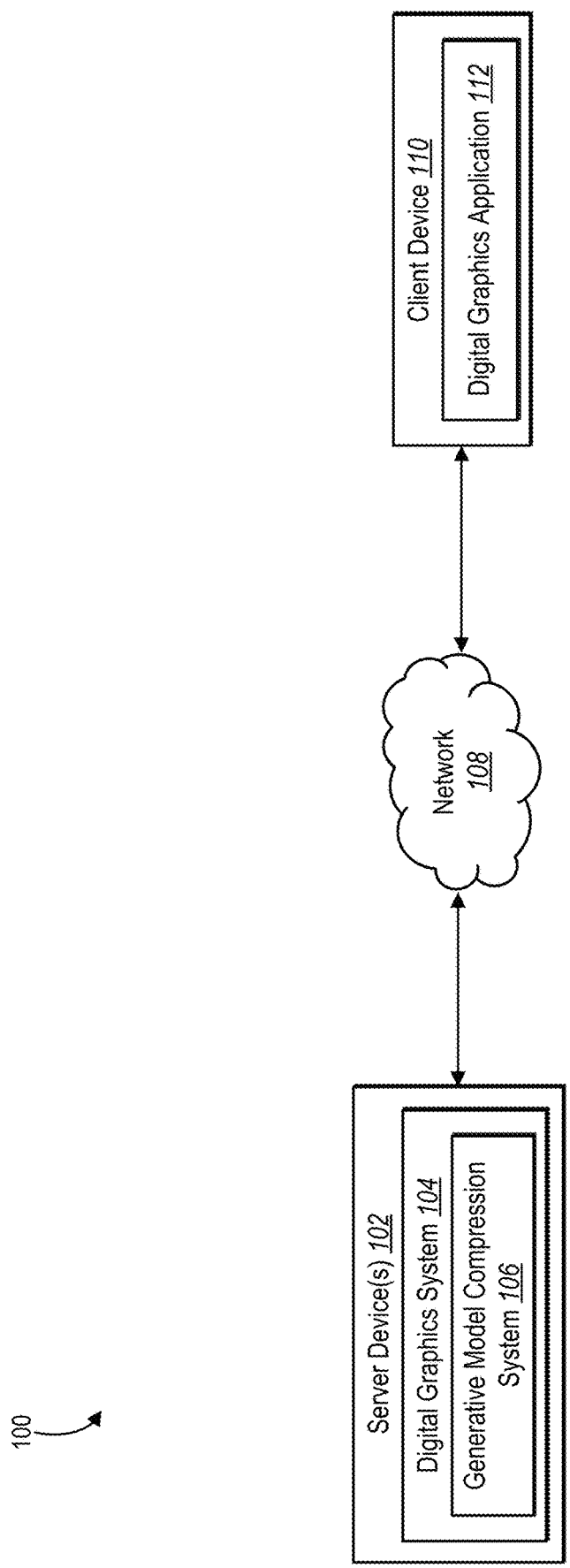
FIG. 1 illustrates a schematic diagram of an example system in which a generative model compression system operates in accordance with one or more embodiments.

One or more embodiments of a generative model compression system compress a noise-to-image GAN utilizing channel pruning and knowledge distillation. For example, the generative model compression system generates a pruned GAN by pruning channels of a noise-to-image GAN utilizing outgoing channel weights that indicate channel impact. Furthermore, in some embodiments, the generative model compression system also generates a distilled noise-to-image GAN from the pruned GAN by learning parameters for the distilled GAN that cause outputs of the distilled GAN to mimic outputs of the noise-to-image GAN.

As mentioned above, in one or more embodiments, the generative model compression system generates a pruned GAN. For instance, the generative model compression system utilizes a full-sized noise-to-image GAN to generate an image. Then, in some embodiments, the generative model compression system identifies outgoing channel weights of the channels as a saliency indicator for the channels of the full-sized noise-to-image GAN. In one or more embodiments, the outgoing channel weights are identified as L1-norms of the outgoing channel weights of the channels (i.e., normalized outgoing channel weights). Indeed, in one or more embodiments, the generative model compression system prunes the noise-to-image GAN by selecting and removing one or more channels from the noise-to-image GAN based on the normalized outgoing channel weights to generate the pruned GAN (e.g., removing channels that are determined to have low importance/impact.

In certain instances, the generative model compression system further utilizes a content aware pruning approach by pruning channels of the noise-to-image GAN that are not sensitive to specific content within the image generated using the noise-to-image GAN. More specifically, in certain instances, the generative model compression system modifies an image generated by a noise-to-image GAN by applying noise within specific content of the image (e.g., a foreground region that may depict an object such as a face). Subsequently, in one or more embodiments, the generative model compression system determines a differentiable loss between the foreground-modified image and the original image from the noise-to-image GAN. To prune the channels of the noise-to-image GAN, in one or more embodiments, the generative model compression system backpropagates the differentiable loss within the noise-to-image GAN to obtain gradients for outgoing channel weights that account for the differentiable loss. Finally, in some embodiments, the generative model compression system prunes the noise-to-image GAN by selecting and removing one or more channels from the noise-to-image GAN based on the gradients of the outgoing channel weights to generate the pruned GAN.

Additionally, in some embodiments, the generative model compression system generates a distilled GAN from the pruned GAN. For example, the generative model compression system utilizes knowledge distillation losses from between output images of a full-size noise-to-image GAN and the pruned GAN to cause the pruned GAN to mimic the outputs of the full-size noise-to-image GAN. More specifically, in one or more embodiments, the generative model compression system identifies one or more knowledge distillation losses such as a norm-based knowledge distillation loss and/or a perceptual knowledge distillation loss from between images generated by both the noise-to-image GAN and the pruned GAN. Indeed, in some embodiments, the generative model compression system utilizes the one or more knowledge distillation losses to learn (or adjust) parameters for the distilled GAN that cause the distilled GAN to generate an output that materially mimics the output of the noise-to-image GAN.

In one or more instances, the generative model compression system further utilizes a content aware knowledge distillation approach to generate a distilled GAN from the pruned GAN. More specifically, in one or more embodiments, the generative model compression system learns (or adjusts) parameters for the distilled GAN utilizing one or more knowledge distillation losses that correspond to specific content within images generated by the full-sized noise-to-image GAN and the pruned GAN. For example, the generative model compression system generates foreground masks for images generated by the full-sized noise-to-image GAN and the pruned GAN. Indeed, in some instances, the foreground masks isolate specific content of the image (e.g., a foreground region that may depict an object such as a face). Subsequently, the generative model compression system determines a knowledge distillation loss (e.g., a norm-based loss and/or a perceptual loss) between foreground masks of the images. Moreover, in one or more embodiments, the generative model compression system generates the distilled GAN from the pruned GAN by learning parameters for the distilled GAN utilizing the one or more knowledge distillation losses. In some embodiments, the generative model compression system additionally utilizes a GAN minimax loss that is specific to the image generated by the pruned GAN with the one or more knowledge distillation losses to generate the distilled GAN.

Furthermore, in one or more embodiments, the generative model compression system utilizes the distilled GAN for various computer vision tasks. For example, the generative model compression system deploys the compact and efficient distilled GAN onto a mobile device such that the distilled GAN operates locally on the mobile device (e.g., within the hardware capabilities of the mobile device). Indeed, in one or more embodiments, the generative model compression system utilizes the distilled GAN to edit images. In some instances, the generative model compression system implements the compact distilled GAN within a mobile device to cause the mobile device to utilize the distilled GAN for image editing (or other computer vision task).

The disclosed generative model compression system provides a number of advantages over conventional systems. For instance, the generative model compression system generates a compact and efficient GAN. Indeed, the pruned and distilled GAN generated by the generative model compression system is condensed and, therefore, utilizes a reduced amount of storage space. In addition, in certain instances, the condensed GAN also utilizes less processing resources and memory resources. In one or more embodiments, the generative model compression system is able to generate a compact GAN that increases the efficiency of the computing devices implementing the compact GAN, while yielding comparable results as its full-size noise-to-image GAN counterpart. In some instances, the generative model compression system 106 generates a pruned and distilled GAN that is compact and dense such that it leverages Basic Linear Algebra Subprogram (BLAS) efficiently.

Additionally, in contrast to conventional systems, the generative model compression system generates a compact GAN that is flexible. More specifically, by generating a compact GAN that is materially as effective as its full-size counterpart, the generative model compression system, in certain instances, easily utilizes the compact GAN in a wide variety of computer vision tasks. For example, the compact GAN is deployable on and fits on a greater range of mobile devices that are limited in hardware (e.g., limited storage, memory, processing power). Furthermore, due to the reduced demand of computational resources by the pruned and distilled GAN, in some embodiments, the generative model compression system utilizes the compact GAN in a wider range of computer vision tasks (e.g., repeatedly editing singular images or a large number of images for a large user base). Likewise, in some embodiments, the generative model compression system is able to implement the lightweight compact GAN in real-time (or near-real time) computer vision tasks.

Furthermore, in one or more embodiments, the pruning and distillation approach utilized by the generative model compression system results in a condensed GAN that is accurate in comparison to a full-size noise-to-image GAN. For instance, the generative model compression system generates a pruned and distilled GAN that outputs a similar generated visual quality and minor performance loss in image generation and image projection compared to a full-size noise-to-image GAN. Additionally, in one or more embodiments, by utilizing a pruning and distillation approach that accounts for specific content from outputs of both the full-size and condensed GAN, the generative model compression system generates a condensed GAN that produces outputs that faithfully mimic outputs of a full-size noise-to-image GAN. Under an evaluation of outputs produced by a full-size GAN compared to the compact GAN generated by the generative model compression system, the compact GAN is able to operate with 11 times less floating point operations per second (FLOPs) while only experiencing a 0.59 peak signal-to-noise ratio decibel (PSNR) loss compared to the full-sized GAN. Indeed, one or more improvements in efficiency and accuracy of GANs generated by the generative model compression system (via experimental results) are described in greater detail below.

Turning now to the figures, FIG. 1 illustrates a schematic diagram of one embodiment of a system 100 (or environment) in which a generative model compression system 106 operates in accordance with one or more embodiments. As illustrated in FIG. 1, the system 100 includes server device(s) 102, a network 108, and a client device 110. As further illustrated in FIG. 1, the server device(s) 102 and the client device 110 communicate via the network 108.

As shown in FIG. 1, the server device(s) 102 include a digital graphics system 104 which further includes the generative model compression system 106. For instance, the server device(s) 102 includes, but is not limited to, a computing (or computer) device (as explained below with reference to FIG. 10). In one or more embodiments, the generative model compression system 106 prunes one or more channels of a noise-to-image GAN. In addition, in some embodiments, the generative model compression system 106 also generates a distilled GAN from the pruned GAN by learning parameters of the distilled GAN such that outputs of the distilled GAN mimic outputs of the full-sized noise-to-image GAN. Indeed, by pruning and distilling a full-sized noise-to-image GAN in accordance with one or more embodiments, the generative model compression system 106 generates a compact and effective GAN that utilizes less storage, processing, and other computing resources.

Furthermore, as shown in FIG. 1, the system 100 includes the client device 110. In one or more embodiments, the client device 110 includes, but is not limited to, a mobile device (e.g., smartphone, tablet), a laptop, a desktop, or any other type of computing device, including those explained below with reference to FIG. 10. In some embodiments, although not shown in FIG. 1, the client device 110 is operated by a user to perform a variety of functions (e.g., via a digital graphics application 112). For instance, the client device 110 performs functions such as, but not limited to, implementing a pruned and distilled GAN generated by the generative model compression system 106 to generate, modify, and/or display digital content (e.g., images and/or videos). In some embodiments, the client device 110 receives a pruned and distilled GAN from the generative model compression system 106 and implements the compact GAN utilizing local hardware of the client device 110. Moreover, as shown in FIG. 1, the client device 110 communicates with the server device(s) 102 via the network 108.

To access the functionalities of the generative model compression system 106 (as described above), in certain embodiments, a user interacts with the digital graphics application 112 on the client device 110. For example, the digital graphics application 112 includes one or more software applications (e.g., to utilize or generate a compact GAN in accordance with one or more embodiments herein) installed on the client device 110. In some instances, the digital graphics application 112 is hosted on the server device(s) 102. In addition, when hosted on the server device(s), the digital graphics application 112 is accessed by the client device 110 through a web browser and/or another online interfacing platform and/or tool.

Although FIG. 1 illustrates the generative model compression system 106 being implemented by a particular component and/or device within the system 100 (e.g., the server device(s) 102), in some embodiments the generative model compression system 106 is implemented, in whole or part, by other computing devices and/or components in the system 100. For instance, in some embodiments, the generative model compression system 106 is implemented on the client device 110. In particular, in some embodiments, the client device 110 generates the pruned and distilled GAN in accordance with one or more embodiments.

Additionally, as shown in FIG. 1, the system 100 includes the network 108. As mentioned above, in some instances, the network 108 enables communication between components of the system 100. In certain embodiments, the network 108 includes a suitable network and may communicate using any communication platforms and technologies suitable for transporting data and/or communication signals, examples of which are described with reference to FIG. 10. Furthermore, although FIG. 1 illustrates the server device(s) 102 and the client devices 110 communicating via the network 108, in certain embodiments, the various components of the system 100 communicate and/or interact via other methods (e.g., the server device(s) 102 and the client device 110 communicating directly).

Figure 2:
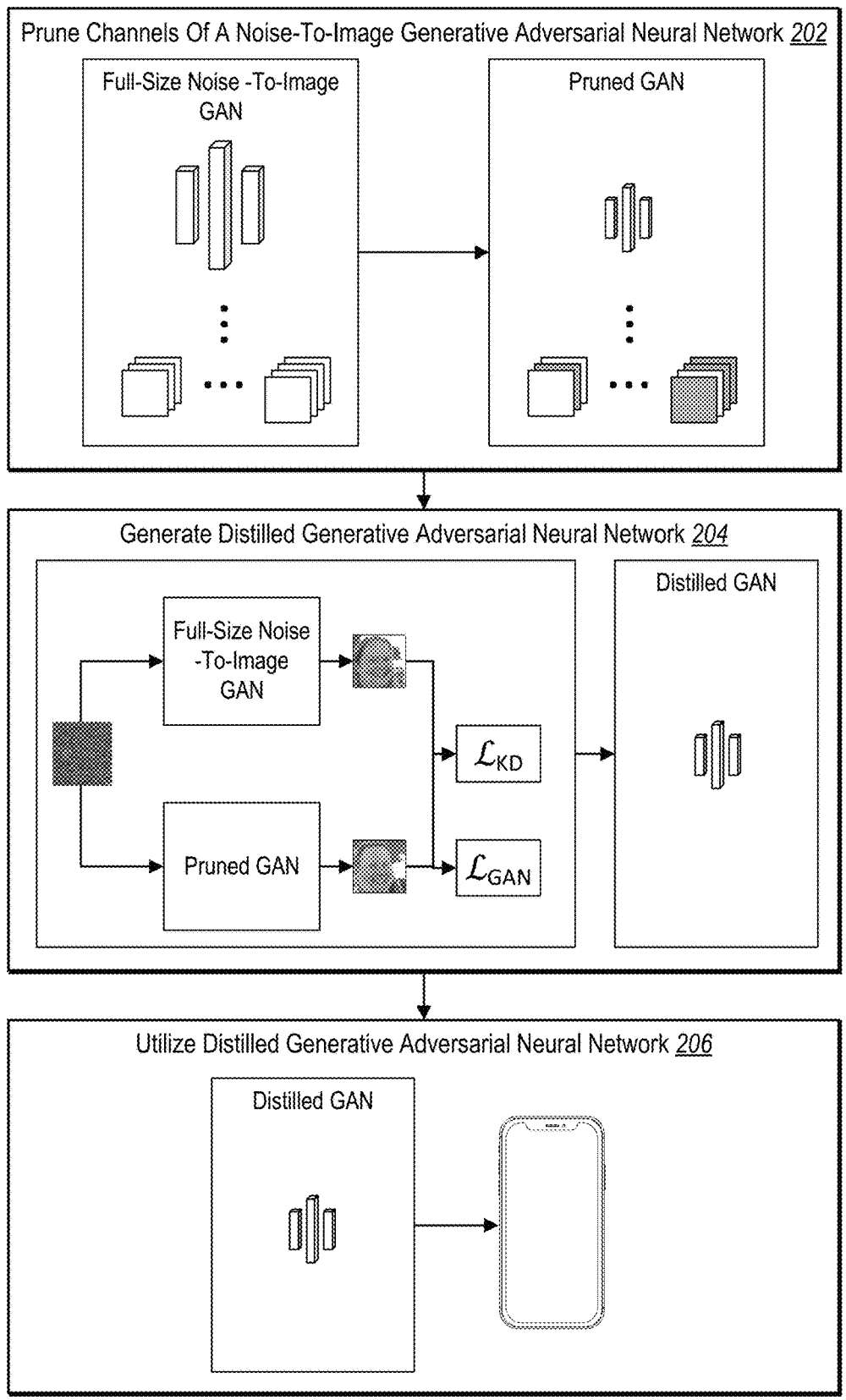
FIG. 2 illustrates an overview of a generative model compression system generating a pruned and distilled GAN in accordance with one or more embodiments.

As previously mentioned, in one or more embodiments, the generative model compression system 106 generates a condensed noise-to-image GAN by pruning channels of a noise-to-image GAN and learning parameters for the pruned GAN through knowledge distillation. For instance, FIG. 2 illustrates an overview of the generative model compression system 106 generating a distilled GAN from a noise-to-image GAN to fit and operate on a mobile device. As shown in FIG. 2, the generative model compression system 106 prunes channels of a noise-to-image GAN, then generates a distilled GAN from the pruned GAN, and finally utilizes the generated distilled GAN.

Indeed, as illustrated in FIG. 2, the generative model compression system 106 first prunes channels of a noise-to-image generative adversarial neural network in an act 202. As described in greater detail below (e.g., in relation to FIGS. 3 and 4), in one or more embodiments, the generative model compression system 106 utilizes an outgoing channel weight to identify an importance of a channel. Then, in some instances, the generative model compression system 106 prunes channels by removing channels that are determined to be of low importance within the GAN. In some embodiments, the generative model compression system 106 further backpropagates a content aware differentiable loss between an output image of a noise-to-image GAN and a modified version of the output image into the noise-to-image GAN prior to utilizing the outgoing channel weights to prune the noise-to-image GAN (as described in relation to FIGS. 4A and 4B).

In one or more embodiments, the generative model compression system 106 utilizes a noise-to-image generative adversarial neural network (GAN) includes a neural network that generates photorealistic images depicting a person or another object (e.g., facial portrait images). In some embodiments, the noise-to-image GAN encodes images into a latent vector space and decodes (or converts) latent vectors from the latent vector space to synthesize photorealistic images (from random noise). In one or more embodiments, the generative model compression system 106 utilizes a noise-to-image GAN that is trained on a dataset of facial images (e.g., Flickr-Faces-HQ dataset, CELEBA-HQ dataset) to generate facial images from latent vectors. In particular, the generative model compression system 106 utilizes a noise-to-image GAN based on a variety of neural network models such as, but not limited to, an unconditional GAN, a Deep Convolutional GAN (DCGAN), and/or a conditional GAN (cGAN).

In certain instances, the generative model compression system 106 utilizes a noise-to-image GAN that utilizes a mapping network to convert a random latent vector (e.g., a Z-space vector) to a latent vector that represents facial attributes (e.g., a D-space vector). Then, in some embodiments, the noise-to-image GAN (utilized by the generative model compression system 106) uses a synthesis network to convert the latent vector that represents facial attributes to a generated image. Indeed, in some embodiments, the noise-to-image GAN (utilized by the generative model compression system 106) is learned using facial images to generate facial images (e.g., portrait images depicting a person). As an example, in some embodiments, the generative model compression system 106 utilizes a noise-to-image GAN as described by R. Abdal et al. in *A Style-Based StyleFlow: Attribute-conditioned Exploration of StyleGAN-Generated Images using Conditional Continuous Normalizing Flows*, arXiv:2008.02401, (2020), the content of which is hereby incorporated by reference in its entirety. Another example of a noise-to-image GAN include that described by T. Karras et al. in *A Style-Based Generator Architecture for Generative Adversarial Networks*, In Proceedings of the IEEE Conference on Computer Vision and Pattern Recognition, pages 4401-4410, 2019, the content of which is hereby incorporated by reference in its entirety.

In some embodiments, in relation to the act 202 of FIG. 2, the generative model compression system 106 utilizes outgoing channel weights of channels from the noise-to-image GAN to prune the channels. For example, a channel includes a portion of a GAN that outputs information corresponding to the content generated by a neural network. More specifically, in some embodiments, a channel outputs information that corresponds to a feature or aspect of an output of the GAN. In some instances, a layer of a GAN includes one or more channels (and filters). Furthermore, in some embodiments, pruning includes removing GAN channels (or other portions of the GAN such as layers or filters) from a GAN to reduce the size and/or complexity of the GAN. In certain instances, pruning includes removing GAN portions by eliminating connections, and in some cases, re-connecting incoming connections of a GAN portion with existing outgoing connections of the GAN portion.

Additionally, in some embodiments, a GAN channel includes an outgoing channel weight. In some instances, a GAN channel computes an output value by applying a function to values provided as inputs to the GAN channel, where the function is determined by an outgoing channel weight. Indeed, in one or more embodiments, the GAN tunes and learns an optimal outgoing channel weight to transform inputs to the GAN channel into accurate output value predictions during training (e.g., backpropagation). For instance, the outgoing channel weight controls the function that computes an output value from a provided input value to a GAN channel.

As further shown in FIG. 2, the generative model compression system 106 generates a distilled generative adversarial neural network in an act 204. As described in greater detail below (e.g., in relation to FIGS. 5 and 6), in some instances, the generative model compression system 106 generates a distilled GAN from a pruned GAN by utilizing knowledge distillation losses by comparing output images of both a full-size noise-to-image GAN and a pruned GAN. Indeed, in some embodiments, the generative model compression system 106 utilizes the knowledge distillation losses to learn parameters for the distilled GAN that cause the distilled GAN to generate outputs that mimic the outputs of the full-size noise-to-image GAN. In some instances, the generative model compression system 106 utilizes content aware knowledge distillation losses by utilizing foreground masks for the compared output images to learn the parameters for the distilled GAN (as described in relation to FIG. 6).

In one or more embodiments, parameters of a GAN include one or more values that correspond to functions of the GAN that affect the output of the GAN. In some instances, the parameters of the GAN include, but are not limited to, outgoing channel weights, coefficients of layer activation functions, initialization values for one or more portions of the GAN. In one or more embodiments, the generative model compression system 106, while learning, adjusts (e.g., optimizes) such parameters to reduce (e.g., minimize) an error corresponding to an output of the GAN (e.g., minimize a loss associated with the output of the GAN).

In some embodiments, a knowledge distillation loss includes an error value between outputs of two GAN models that is utilized to cause one GAN model to mimic the other GAN model. In particular, in one or more embodiments, the knowledge distillation loss is utilized to transfer knowledge from an original GAN model to another GAN model such that the other GAN model mimics outputs of the original GAN model. For example, as described in greater detail below (e.g., in relation to FIG. 5), a knowledge distillation loss includes a norm-based knowledge distillation loss and/or a perceptual knowledge distillation loss.

As further illustrated in FIG. 2, the generative model compression system 106 utilizes a distilled generative adversarial neural network in an act 206. For instance, the generative model compression system 106 deploys the compact and efficient distilled GAN (that is generated in accordance with one or more embodiments) onto a mobile device (e.g., a smartphone or tablet) to cause the mobile device to implement the distilled GAN. In some instances, the generative model compression system 106 implements the distilled GAN on a mobile device to cause the mobile device to perform various tasks such as generating images and/or modifying images. Indeed, the generative model compression system 106 utilizing a distilled GAN is described in greater detail below (e.g., in relation to FIG. 8).

As mentioned above, in or more embodiments, the generative model compression system 106 prunes channels of a noise-to-image GAN. In particular, in some embodiments, the generative model compression system 106 prunes excessive and/or redundant portions (e.g., channels) of a GAN while maintaining the accuracy of the GAN. Indeed, in some instances, the generative model compression system 106 maintains the accuracy of the GAN while pruning channels of the GAN by removing channels that are determined to have a low impact (or affect) on the final output of the GAN.

Figure 3:
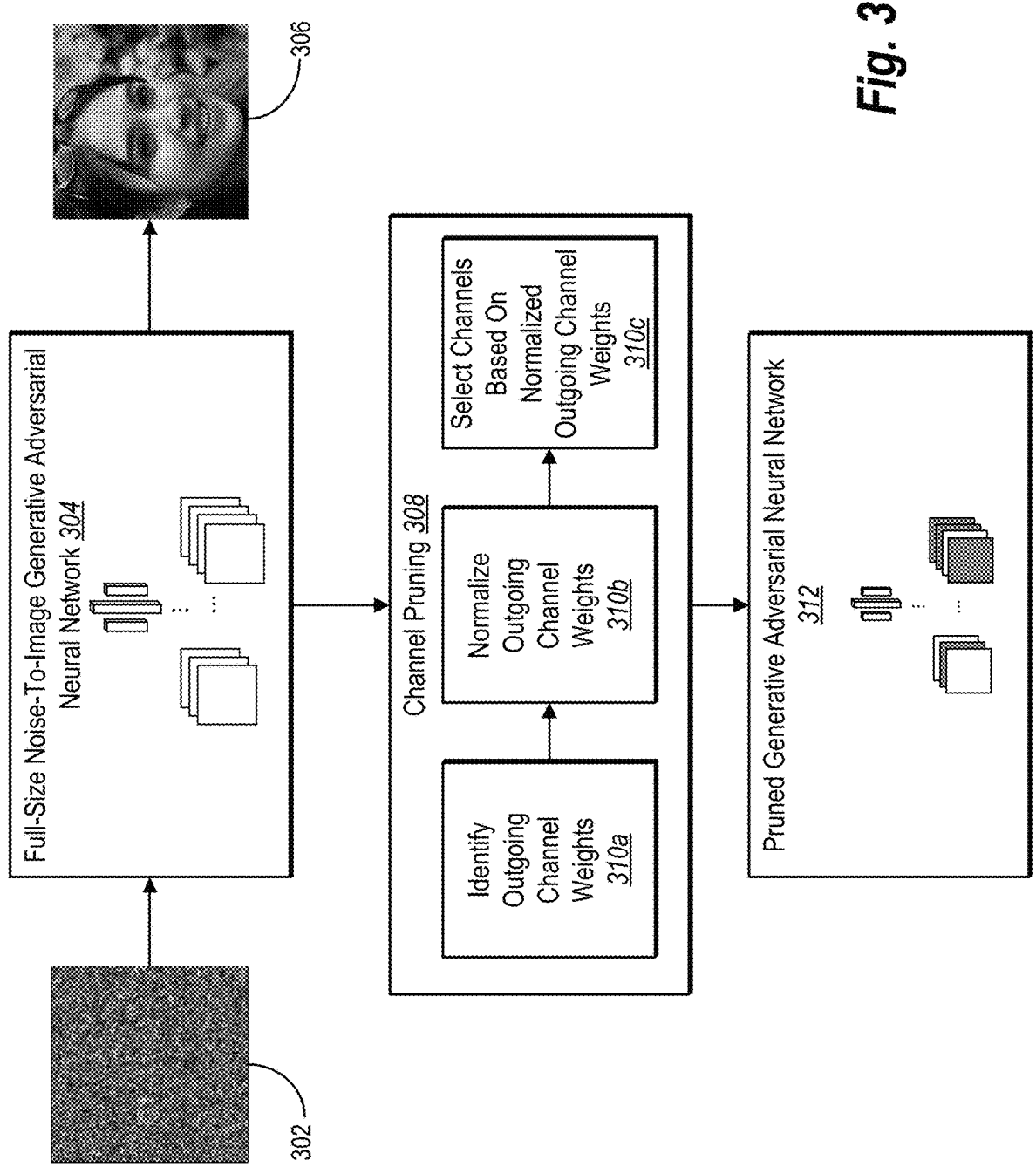
FIG. 3 illustrates a generative model compression system pruning channels of a noise-to-image GAN in accordance with one or more embodiments.

For instance, FIG. 3 illustrates the generative model compression system 106 generating a pruned GAN by pruning channels of a noise-to-image GAN based on outgoing channel weights corresponding to the channels of the noise-to-image GAN. As shown in FIG. 3, the generative model compression system 106 utilizes a full-size noise-to-image generative adversarial neural network 304 to output an image 306 from input noise 302. Indeed, in one or more embodiments, the generative model compression system 106 causes the full-size noise-to-image generative adversarial neural network 304 to generate the image 306 under its normal operating circumstances.

Additionally, as shown in FIG. 3, the generative model compression system 106, while channel pruning in an act 308, identifies outgoing channel weights in an act 310*a* from the full-size noise-to-image generative adversarial neural network 304 upon generating the image 306. As further illustrated in FIG. 3, the generative model compression system 106 develops an importance metric from the identified outgoing channel weights that demonstrates channel sensitivity of each channel from the full-size noise-to-image generative adversarial neural network 304 by normalizing the outgoing channel weights in an act 310*b*. Subsequently, as shown in FIG. 3, the generative model compression system 106 utilizes the normalized outgoing channel weights (from the act 310*b*) to select (to keep or remove) one or more channels of the full-size noise-to-image generative adversarial neural network 304 in the act 310*c*. Indeed, as shown in FIG. 3, the generative model compression system 106 generates the pruned generative adversarial neural network 312 upon performing channel pruning in the act 308.

As just mentioned, in some embodiments, the generative model compression system 106 utilizes outgoing channel weights to identify the impact (or importance) of channels to determine which channels to removing during a pruning process. Indeed, in one or more embodiments, the generative model compression system 106 normalizes (or regularizes) the outgoing channel weights and utilizes the normalized outgoing channel weights to select (or prune) one or more channels of a noise-to-image GAN. For instance, the generative model compression system 106 utilizes normalized outgoing channel weights of channels as saliency indicators in which higher normalized outgoing channel weight values correspond to more informative channels while lower normalized outgoing channel weight values correspond to redundant (less informative) channels.

As an example, in some instances, the generative model compression system 106 normalizes outgoing channel weights by determining L1-norms for the outgoing channel weights. Indeed, in one or more embodiments, the generative model compression system 106 determines the L1-norm of each channel's outgoing channel weight value as L1-norm outgoing channel weights. Although one or more embodiments herein illustrate the generative model compression system 106 utilizing an L1-norms for the outgoing channel weights, in some embodiments, the generative model compression system 106 utilizes various normalization (or regularization) approaches to normalize the outgoing channel weights. For example, the generative model compression system 106 utilizes various normalization (or regularization) approaches such as, but not limited to, L2-norms, max norm, zero norm, and/or Euclidean norm.

Subsequently, upon determining normalized outgoing channel weights (e.g., L1-norm outgoing channel weights), the generative model compression system 106, in one or more embodiments, utilizes the normalized outgoing channel weights to prune one or more channels. For example, a higher normalized outgoing channel weight indicates that the corresponding GAN channel outputs information that affects the output of the GAN (i.e., more informative). Furthermore, in some instances, a lower normalized outgoing channel weight indicates that the corresponding GAN channel outputs redundant or less useful information (i.e., provides a lesser impact on the output of the GAN). Using such normalized outgoing channel weights, the generative model compression system 106 removes or prunes out GAN channels having low normalized outgoing channel weights.

In some instances, the generative model compression system 106 selects a channel (or subset of channels) from channels (or a set of channels) corresponding to a noise-to-image GAN that do not satisfy a threshold outgoing channel weight for removal in the pruning process. In particular, in one or more instances, the generative model compression system 106 determines a threshold outgoing channel weight (or normalized outgoing channel weight) to indicate a sufficient level of importance of a channel. For instance, the threshold outgoing channel weight indicates an outgoing channel weight value that corresponds to a channel that is determined as informative and/or impactful on the output of the GAN. Indeed, in one or more embodiments, the generative model compression system 106 determines the threshold outgoing channel weight from user input (e.g., from an admin user of the generative model compression system 106) and/or historical outgoing channel weights from channels of previously pruned GANs that have been determined to be impactful to the resulting GAN.

To illustrate, upon identifying a channel having a (normalized) outgoing channel weight that does not satisfy a threshold outgoing channel weight, in one or more embodiments, the generative model compression system 106 removes the channel from the noise-to-image GAN. In one or more embodiments, the generative model compression system 106 likewise removes each channel that corresponds to an outgoing channel weight that does not satisfy the threshold outgoing channel weight (e.g., a subset of channels). Furthermore, in one or more embodiments, the generative model compression system 106 maintains (or keeps) channels that correspond to outgoing channel weights that satisfy the threshold outgoing channel weight.

In some embodiments, the generative model compression system 106 determines that the outgoing channel weight (of a channel) does not satisfy a threshold outgoing channel weight when the outgoing channel weight does not exceed the threshold outgoing channel weight. Likewise, in one or more embodiments, the generative model compression system 106 determines that an outgoing channel weight satisfies the threshold outgoing channel weight when the outgoing channel weight exceeds or meets the threshold value. Although the above illustrates removing channels when outgoing channel weights do not satisfy a threshold outgoing weight, in one or more embodiments, the generative model compression system 106 removes channels that include outgoing channel weights that satisfy a threshold outgoing channel weight when higher outgoing channel weights indicate less impact (or importance) of the channel.

Furthermore, in certain instances, the generative model compression system 106 utilizes (normalized) outgoing channel weights to rank and prune channels of a noise-to-image GAN. In particular, the generative model compression system 106 ranks channels of the noise-to-image GAN from a highest corresponding outgoing channel weight to a lowest corresponding outgoing channel weight. Then, in some instances, the generative model compression system 106 prunes (or removes) channels of the noise-to-image GAN that correspond to the lowest outgoing channel weights. In some instances, the generative model compression system 106 removes an indicated amount or percentage (e.g., from an admin user) of channels that correspond to the lowest outgoing channel weights. Although the above illustrates pruning channels that correspond to the lowest ranked outgoing channel weights, in one or more embodiments, the generative model compression system 106 prunes channels that correspond to the highest ranked outgoing channel weights when higher outgoing channel weights indicate less impact (or importance) of the channel.

In addition to pruning (or removing) channels, in some embodiments, the generative model compression system 106 prunes (or removes) a variety of components that are associated with the pruned channels. In some cases, the generative model compression system 106 also removes incoming and/or outgoing filters that are associated with the pruned (or removed) channels. In certain implementations, the generative model compression system 106 removes entire layers of the noise-to-image GAN when the channels corresponding to the layer are removed. By doing so, in one or more embodiments, the generative model compression system 106 further reduces the storage space and computational costs of the pruned generator.

Furthermore, in one or more embodiments, the generative model compression system 106 operates a full-size noise-to-image GAN to generate multiple images prior to utilizing observed outgoing channel weights to prune channels of the full-size noise-to-image GAN. For example, the generative model compression system 106 identifies outgoing channel weights for channels during the creation of each image (for the multiple images) from the noise-to-image GAN. Subsequently, in one or more embodiments, the generative model compression system 106 utilizes a statistical value of the (normalized) outgoing channel weights (e.g., an average outgoing channel weight, a median outgoing channel weight, an outgoing channel weight mode) to prune (or remove) channels from the noise-to-image GAN (in accordance with one or more embodiments).

As mentioned above, in some instances, the generative model compression system 106 backpropagates a content aware differentiable loss into a noise-to-image GAN prior to pruning channels of the noise-to-image GAN. In one or more embodiments, the generative model compression system 106 prunes channels that are redundant and/or uninformative to a specific regions of content depicted within an image generated by the noise-to-image GAN. For example, in some implementations, the generative model compression system 106 backpropagates a content aware differentiable loss (that accounts for the specific regions of content depicted within an image) into the noise-to-image GAN to affect the outgoing channel weights of the noise-to-image GAN. Then, in one or more embodiments, the generative model compression system 106 generates a pruned GAN by utilizing the resulting outgoing channel weights to prune channels of the noise-to-image GAN.

Figure 4A:
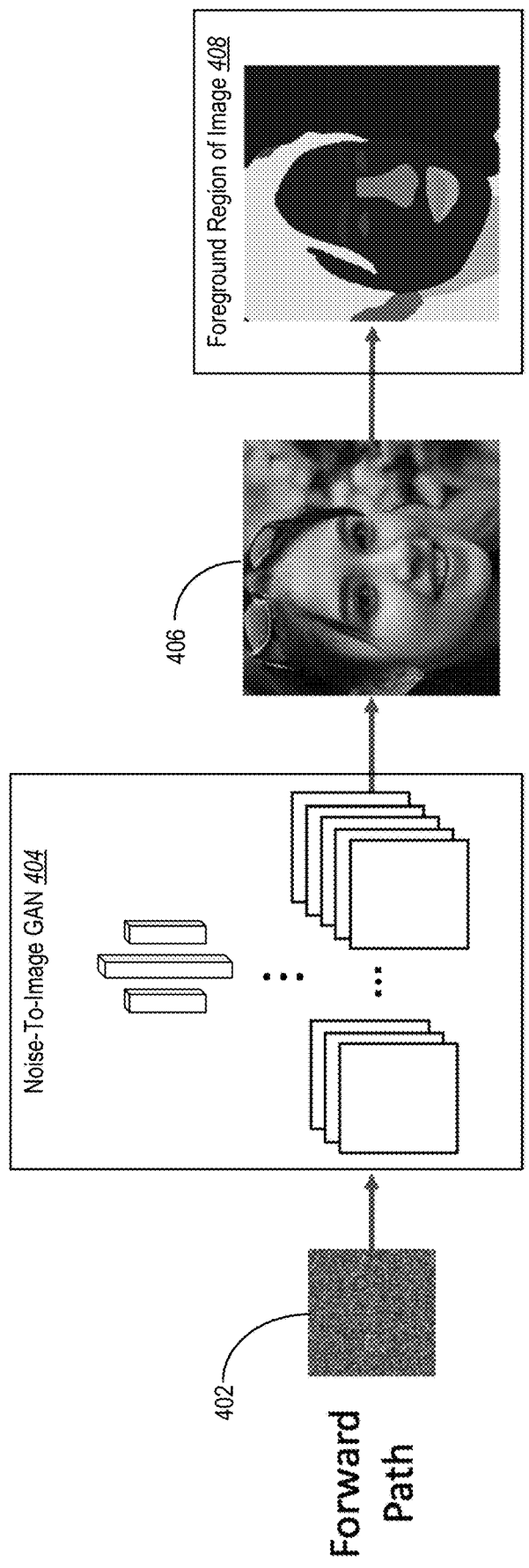
FIGS. 4A-4B illustrate a generative model compression system pruning channels of a noise-to-image GAN utilizing a content aware differentiable loss in accordance with one or more embodiments.
Figure 4B:
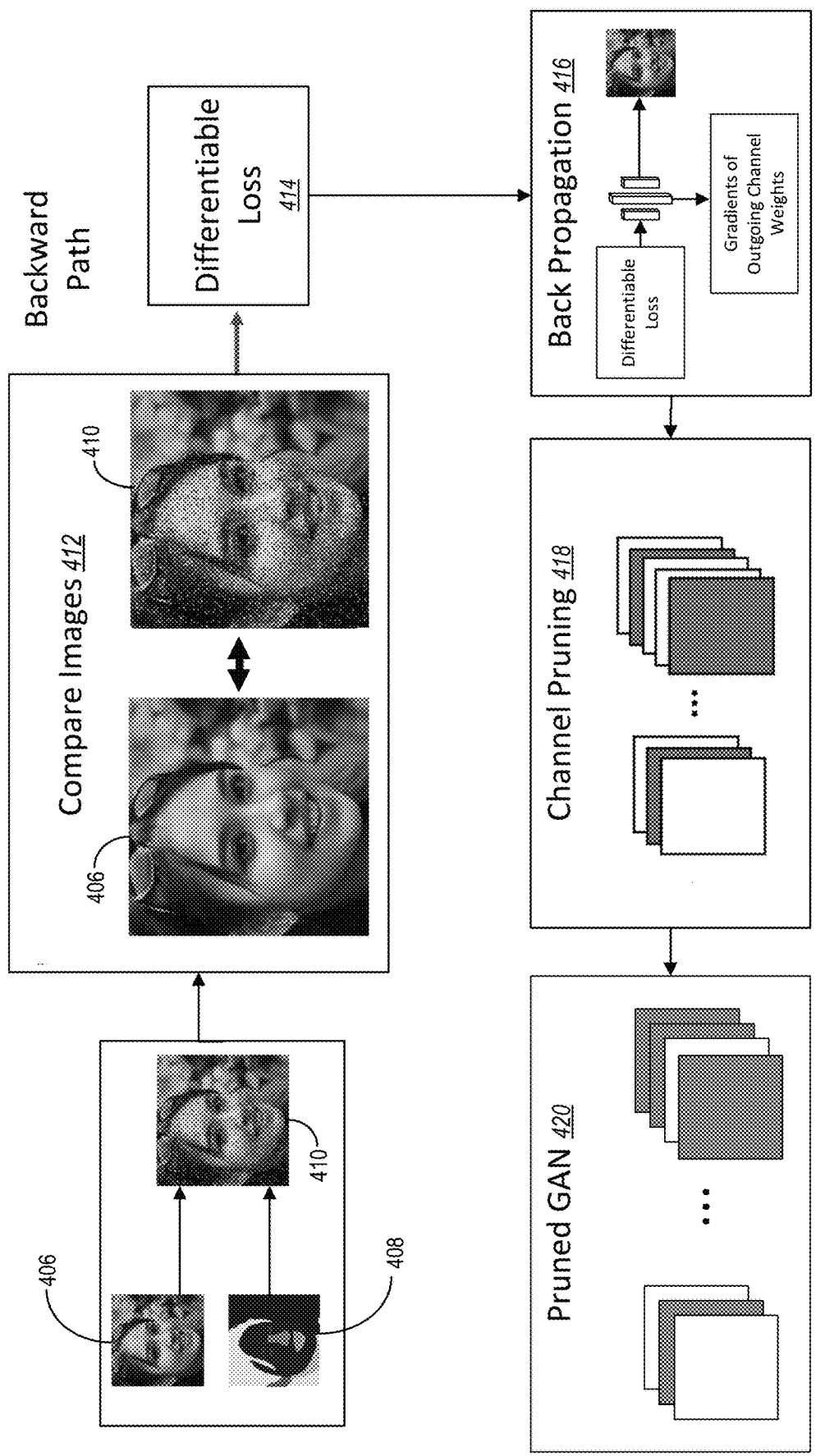

For example, FIGS. 4A and 4B illustrate the generative model compression system 106 utilizing a content aware differentiable loss to prune channels of a noise-to-image GAN. As shown in FIG. 4A, during a forward path, the generative model compression system 106 inputs noise 402 into the noise-to-image GAN 404 to generate an image 406. Then, as shown in FIG. 4A, the generative model compression system 106 identifies a foreground region of the image 408. Subsequently, as shown in FIG. 4B, during a backward path, the generative model compression system 106 modifies the foreground region of the image 408 to generate a foreground-modified image 410 from the image 406.

Then, as shown in FIG. 4B, the generative model compression system 106 compares (in an act 412) the foreground-modified image 410 to the (originally generated) image 406 to determine a differentiable loss 414. Furthermore, as shown in FIG. 4B, the generative model compression system 106 backpropagates (in an act 416) the differentiable loss into noise-to-image GAN. As further shown in FIG. 4B, the generative model compression system 106 utilizes the noise-to-image GAN (after backpropagation in the act 416) to generate an image and identify its corresponding outgoing channel weights (e.g., that account for the backpropagation). Then, as illustrated in FIG. 4, the generative model compression system 106 utilizes the (normalized) outgoing channel weights while channel pruning in the act 418 (in accordance with one or more embodiments) to generate the pruned GAN 420.

In one or more embodiments, the term "image" refers to a digital symbol, picture, icon, and/or other visual illustration depicting one or more objects. For instance, an image includes a digital file having a visual illustration and/or depiction of a person or face (e.g., a portrait image). Indeed, in some embodiments, an image includes, but is not limited to, a digital file with the following extensions: JPEG, TIFF, BMP, PNG, RAW, or PDF.

Furthermore, in one or more embodiments, in relation to FIG. 4A, the generative model compression system 106 parses (or segments) an image to determine a foreground region of an image (e.g., the foreground region of the image 408). For instance, the generative model compression system 106 determines (or detects) a foreground and/or background region of an image to identify a salient object or person in the foreground of the image. Indeed, in certain instances, the generative model compression system 106 identifies the foreground region of an image as the content of interest for the content aware pruning process. In some embodiments, the generative model compression system 106 utilizes content-parsing (or segmentation) models and/or tools that are based on a variety of approaches such as, but not limited to, image classification, clustering, histogram-based methods, and/or edge detection to identify a foreground region of an image.

Furthermore, in some implementations, the generative model compression system 106 parses an image to segment a face depicted within the image (e.g., in the foreground portion of the image). Indeed, in one or more embodiments, the generative model compression system 106 identifies a detected face portrayed within an image as the foreground region of the image. In certain instances, the generative model compression system 106 utilizes the various parsing (or segmentation) models and/or tools mentioned above with training (or configurations) specific to the detection of faces portrayed within images. Additionally, although one or more embodiments illustrate the generative model compression system 106 parsing faces for content aware pruning (and distillation) of the noise-to-image GAN, the generative model compression system 106, in one or more embodiments, detects a variety of objects (e.g., animals, buildings, vehicles, clothes, landscapes) and utilizes the detected objects during content aware pruning of the noise-to-image GAN.

Moreover, in relation to FIG. 4B, in one or more embodiments, the generative model compression system 106 modifies the identified foreground region of an image to generate a foreground-modified image for utilization in the content aware pruning of noise-to-image GAN channels. In some instance (as shown in FIG. 4B), the generative model compression system 106 modifies a foreground region of an image by applying noise (e.g., random noise) to the foreground region of the image. For example, the generative model compression system 106 applies noise pixels (e.g., random pixels) to the foreground region of an image to create a discrepancy between the modified image and the original image at regions of interest (e.g., in the foreground region where a face is depicted). Indeed, in one or more embodiments, the generative model compression system 106 generates foreground-modified image that highlights a region of content to focus on during the pruning of channels of the noise-to-image GAN.

Although one or more embodiments illustrate the generative model compression system 106 utilizing noise pixels to modify a foreground region of an image (e.g., a depicted face), the generative model compression system 106, in certain instances, modifies the foreground region of the image utilizing various visual attributes. In some implementations, the generative model compression system 106 introduces color-based modifications to the foreground region of the image. Additionally, in some embodiments, the generative model compression system 106 modifies a foreground region of an image to generate a foreground-modified image by removing content of the image at the foreground region (e.g., an image having blank and/or transparent space at the foreground region of the image).

Furthermore, upon generating a foreground-modified image from an image generated by a noise-to-image GAN, in one or more embodiments, the generative model compression system 106 determines a content aware differentiable loss between the foreground-modified image and the (original) image generated by the noise-to-image GAN (e.g., by comparing images in the act 412 as shown in FIG. 4B). For example, the generative model compression system 106 compares the foreground-modified image with the original image to determine a differentiable loss from the original image to the foreground-modified image. In one or more embodiments, the differentiable loss represents a measurement of error between the original image and the foreground-modified image. For instance, the generative model compression system 106 determines various differentiable losses such as, but not limited to, a mean square loss (MSE), a perceptual loss, a quadratic loss, L1-norrm loss, L2-norm loss, and/or learned perceptual image patch similarities (LPIPS).

Furthermore, as shown in FIG. 4B, the generative model compression system 106 backpropagates the differentiable loss 414 in the act 416 into the noise-to-image GAN. In one or more embodiments, the generative model compression system 106 backpropagates the differentiable loss into the noise-to-image GAN to train (or modify) the noise-to-image GAN to account for the differentiable loss caused by the content of interest in an image being modified (e.g., the foreground region). Indeed, in some instances, the generative model compression system 106 backpropagates the differentiable loss from between the foreground-modified image and the original image to calculate a gradient of the loss function with respect to the outgoing channel weights of the noise-to-image GAN.

After backpropagating the differentiable loss into the noise-to-image GAN, the generative model compression system 106 identifies the calculated gradients corresponding to each of the outgoing channel weights associated with the noise-to-image GAN to prune channels of the noise-to-image GAN. In particular, in one or more embodiments, the generative model compression system 106 normalizes the calculated gradients of each of the outgoing channel weights after backpropagation of the differentiable loss. Indeed, in one or more embodiments, the generative model compression system 106 normalizes the calculated gradients as described above (e.g., using a L1-norm, L2-norm, max norm).

Then, in one or more embodiments, the generative model compression system 106 utilizes the normalized gradients of the outgoing channel weights (from backpropagation of the differentiable loss) to identify channels of the noise-to-image GAN that were informative (or sensitive) to the content of interest (e.g., the foreground region of the image) and also identify channels that were not informative (or sensitive) to such content of interest. Indeed, in some embodiments, the generative model compression system 106 prunes channels that were not informative (or sensitive) to such content of interest. To identify the channels to prune, in certain instances, the generative model compression system 106 identifies channels corresponding to lower (normalized) gradients of outgoing channel weights as the channels that output redundant or less useful information in relation to the content of interest. In addition, in one or more embodiments, a higher (normalized) gradient of outgoing channel weight indicates that the corresponding channel outputs information that affects the output of the GAN in relation to the content of interest.

For instance, the generative model compression system 106 selects one or more GAN channels to prune based on the (normalized) gradients of outgoing channel weights corresponding to the GAN channels. In some instances, the generative model compression system 106 selects GAN channels corresponding to the lower (normalized) gradients of outgoing channel weights to remove from the GAN to generate the pruned GAN. In one or more embodiments, the generative model compression system 106 selects GAN channels to prune from the noise-to-image GAN by utilizing a threshold gradient and/or by ranking the GAN channels based on the calculated gradients of the outgoing channel weights corresponding to the GAN channels.

Indeed, in one or more embodiments, the generative model compression system 106 prunes (or removes) channels that correspond to outgoing channel weights that have calculated gradients that do not satisfy a threshold gradient. In particular, the generative model compression system 106 utilizes a threshold gradient in comparison to calculated gradients of outgoing channel weights from channels of the noise-to-image GAN to prune channels of the noise-to-image GAN as described above (e.g., in relation to pruning channels using normalized outgoing channel weights and a threshold channel weight). For example, the generative model compression system 106 generates a pruned GAN using the content aware differentiable loss by pruning channels that correspond to calculated gradients (from backpropagating the differentiable loss) that do not satisfy a gradient threshold and keep channels that correspond to calculated gradients that satisfy the gradient threshold (e.g., in accordance with one or more embodiments).

Additionally, in some embodiments, the generative model compression system 106 prunes (or removes) channels that correspond to calculated normalized gradients of the outgoing channel weights by ranking the channels based on the calculated normalized gradients. For instance, the generative model compression system 106 ranks the channels of the noise-to-image GAN from a highest corresponding gradient of outgoing channel weight to a lowest corresponding gradient of outgoing channel weight as described above (e.g., in relation to ranking and pruning channels using normalized outgoing channel weights).

Although one or more embodiments herein illustrate the generative model compression system 106 utilizing a content aware differentiable loss that corresponds to a face depicted within an image to prune channels of a noise-to-image GAN, the generative model compression system 106, in certain instances, utilizes content aware channel pruning for various subjects (e.g., objects, text, animals) depicted within an image. Indeed, in one or more embodiments, the generative model compression system 106 parses an image generated by a noise-to-image GAN to identify a subject as the content of interest. Then, in some cases, the generative model compression system 106 modifies in regions depicting the subject and then determines a differentiable loss between the modified image and the original image to calculate gradients of outgoing channel weights corresponding to the channels of the noise-to-image GAN by back-propagating the differentiable loss. Subsequently, in one or more embodiments, the generative model compression system 106 utilizes the calculated gradients of the outgoing channel weights to prune one or more channels to generate a pruned GAN in accordance with one or more embodiments.

In some embodiments, the generative model compression system 106 utilizes the pruned GAN by deploying the pruned GAN onto a mobile device to cause the mobile device to implement the pruned GAN. In particular, in some instances, the generative model compression system 106 utilizes the pruned GAN to generate images and/or modify images. As described in greater detail below, the generative model compression system 106 generates a pruned noise-to-image GAN that accurately generates images in comparison to its full-size noise-to-image GAN counterpart.

As mentioned above, in one or more embodiments, the generative model compression system 106 further generates a distilled noise-to-image GAN from a pruned noise-to-image GAN. In particular, in some implementations, the generative model compression system 106 learns parameters for a distilled GAN that cause the distilled GAN to generate outputs that mimic outputs of a full-size noise-to-image GAN. More specifically, in one or more embodiments, the generative model compression system 106 utilizes knowledge distillation from a combination of knowledge distillation losses to transfer knowledge from a full-size noise-to-image GAN to a pruned GAN (generated in accordance with one or more embodiments) to generate a distilled GAN that generates outputs that are accurate in comparison to outputs of the full-size noise-to-image GAN.

Figure 5:
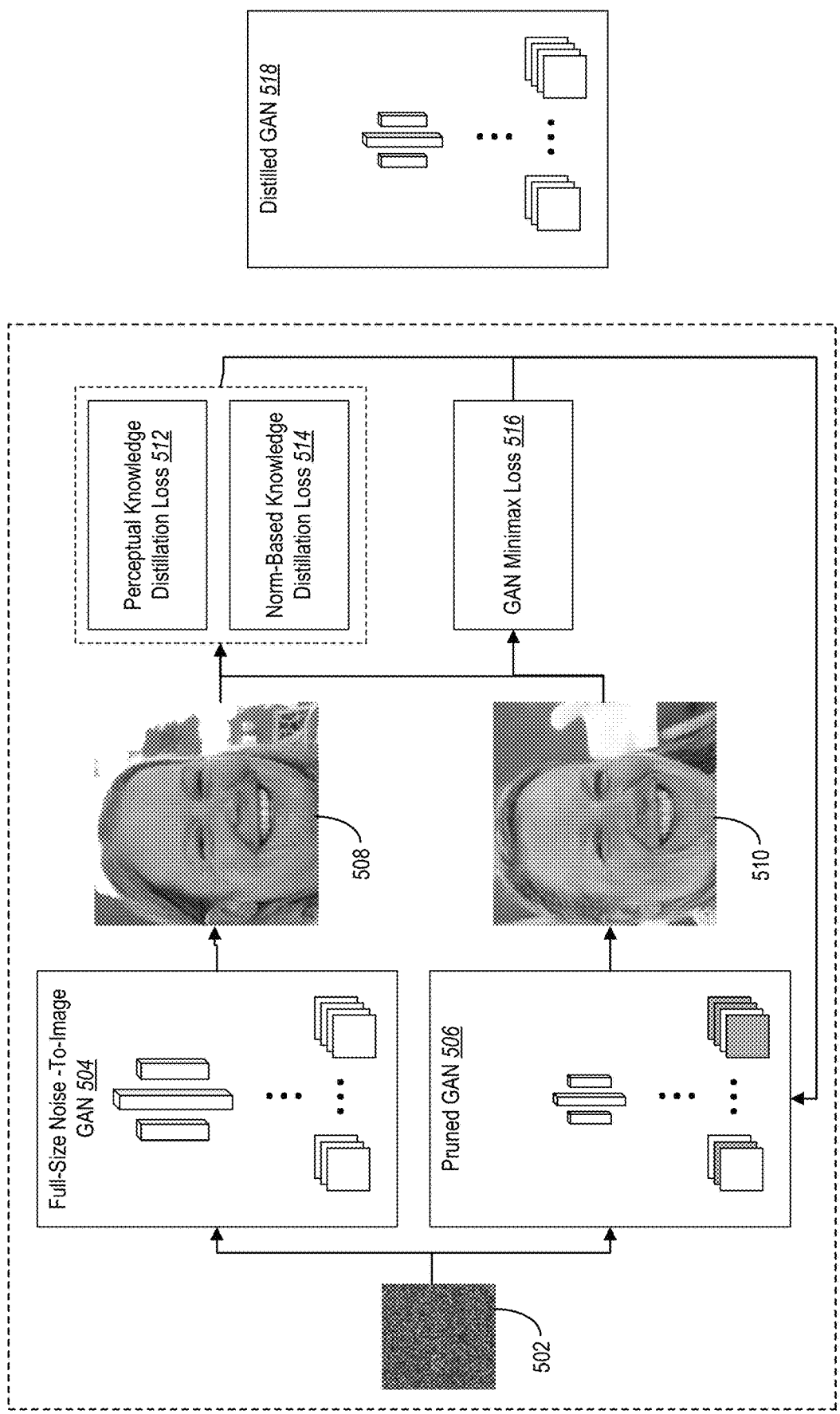
FIG. 5 illustrates a generative model compression system learning parameters of a distilled GAN utilizing knowledge distillation in accordance with one or more embodiments.

For instance, FIG. 5 illustrates the generative model compression system 106 generating a distilled GAN from a pruned GAN by learning parameters for the distilled GAN that cause outputs of the distilled GAN to mimic outputs of a full-size noise-to-image GAN. In particular, as shown in FIG. 5, the generative model compression system 106 inputs noise 502 into a full-size noise-to-image GAN 504 to generate an image 508. Likewise, as illustrated in FIG. 5, the generative model compression system 106 inputs the noise 502 into a pruned GAN 506 to generate an image 510. Subsequently, as shown in FIG. 5, the generative model compression system 106 compares the image 508 and the image 510 to determine one or more losses. For instance, the generative model compression system 106 determines a perceptual knowledge distillation loss 512 and a norm-based knowledge distillation loss 514. Furthermore, as illustrated in FIG. 5, the generative model compression system 106 also determines a GAN minimax loss 516 for the pruned GAN 506 in relation to the generated image 510.

Additionally, as shown in FIG. 5, the generative model compression system 106 iteratively learns parameters for a distilled GAN 518 by back-propagating one or more of the losses to update the parameters of the pruned GAN 506. For example, the generative model compression system 106 back-propagates the perceptual knowledge distillation loss 512, the norm-based knowledge distillation loss 514, and the GAN minimax loss 516 to the pruned GAN 506. Indeed, as shown in FIG. 5, the pruned GAN 506 is learned utilizing the perceptual knowledge distillation loss 512, the norm-based knowledge distillation loss 514, and the GAN minimax loss 516 (that transfers knowledge from the output image 508 corresponding to the full-size noise-to-image GAN 504 to the pruned GAN 506). By doing so, in one or more embodiments, the generated distilled GAN 518 (from the pruned GAN 506) generates outputs that accurately mimic the outputs of the full-size noise-to-image GAN 504.

As just mentioned, in one or more embodiments, the generative model compression system 106 determines a norm-based knowledge distillation loss between a full-size noise-to-image GAN and a pruned GAN during training of the pruned GAN to generate a distilled GAN. In particular, in one or more embodiments, the generative model compression system 106 determines a norm-difference between a full-size noise-to-image GAN (G) and a pruned GAN (G') that represents a difference between outputs or one or intermediate layers of both GANs. Then, in one or more embodiments, the generative model compression system 106 generates a distilled GAN that produces similar outputs to that of the full-size noise-to-image GAN (G) by reducing the norm difference between activations of the full-size noise-to-image GAN (G) and the pruned GAN (G').

In certain instances, the generative model compression system 106 determines a norm-based knowledge distillation loss between outputs of the full-size noise-to-image GAN (G) and outputs of the pruned GAN (G'). Indeed, in one or more embodiments, the generative model compression system 106 constructs an output-focused norm-based knowledge distillation loss $\mathcal{L}_{KD}^{norm}$ between an output G(x) from the full-size noise-to-image GAN G and an output G'(x) from the pruned GAN G' by utilizing the following loss function:

$$\mathcal{L}_{KD}^{norm} = \mathbb{E}\left[\|G(x), G'(x)\|_1\right].$$

For example, in the loss function above, the generative model compression system 106 utilizes a random latent code (or variable) x of the noise-to-image GAN and represents an L1-norm as $\|\cdot\|_1$.

In some embodiments, the generative model compression system 106 determines an intermediate norm-based knowledge distillation loss between one or intermediate layers of the full-size noise-to-image GAN and the pruned GAN. In particular, in one or more embodiments, the generative model compression system 106 compares outputs of one or more intermediate layers of the full-size noise-to-image GAN and the pruned GAN to calculate a norm-based loss. To illustrate, in one or more embodiments, the generative model compression system 106 determines an intermediate norm-based knowledge distillation loss $\mathcal{L}_{KD}^{norm}$ between layers of RGB modules (to_rgb) of the full-size noise-to-image GAN G and the pruned GAN G' utilizing the following loss function:

$$\mathcal{L}_{KD}^{norm} = \sum_{t=1}^{T} \mathbb{E}_x\left[\|G_t^{to\_rgb}(x), G_t'^{to\_rgb}(x)\|_1\right].$$

For example, in the loss function above, the generative model compression system 106 determines an L1-norm $\|\cdot\|_1$ for t layers of the to_rgb modules of the GANs G and G' in which $G_T^{to\_rgb}(x)$ is a final output image G(x) and $G_T'^{to\_rgb}(x)$ is a final output image G'(x). Although the loss function above illustrates the generative model compression system 106 utilizing layers of a RGB module, in or more embodiments, the generative model compression system 106 determines an intermediate norm-based knowledge distillation loss $\mathcal{L}_{KD}^{norm}$ between layers of various modules (e.g., incoming RGB layers, outgoing RGB layers, varying resolution layers) of the full-size noise-to-image GAN G and the pruned GAN G'.

Furthermore, in one or more embodiments, the generative model compression system 106 determines a perceptual knowledge distillation loss between a full-size noise-to-image GAN and a pruned GAN during learning of the pruned GAN to generate a distilled GAN. For instance, the generative model compression system 106 utilizes a perceptual knowledge distillation loss to measure low-level visual details and also high-level semantics between output images. In some cases, the generative model compression system 106 utilizes a perceptual knowledge distillation loss to measure perceptual differences between images that that are an approximation of human perceptions of visual distortions between the images. In some instances, the generative model compression system 106 utilizes a perceptual knowledge distillation loss that measure a loss between images that is consistent with human judgments on image perceptual differences.

In some implementations, the generative model compression system 106 measures a learned perceptual image patch similarity (LPIPS) metric between output images of a noise-to-image GAN and a pruned noise-to-image GAN as the perceptual knowledge distillation loss. In particular, the generative model compression system 106 utilizes a measured LPIPS metric between the noise-to-image GAN and the pruned noise-to-image GAN as the perceptual knowledge distillation loss, such as that described by Zhang et al. in The Unreasonable Effectiveness of Deep Features as a Perceptual Metric, Proceedings of the IEEE Conference on Computer Vision and Pattern Recognition 2018, the contents of which are hereby incorporated by reference in their entirety. In some instances, the generative model compression system 106 determines a perceptual knowledge distillation loss $\mathcal{L}_{KD}^{per}$ between an output G(x) from the full-size noise-to-image GAN G and an output G'(x) from the pruned GAN G' with a random latent code (or variable) x of the noise-to-image GAN by utilizing the following loss function:

$$\mathcal{L}_{KD}^{per} = \mathbb{E}_x[\text{LPIPS}(G(x), G'(x))].$$

Additionally, in one or more embodiments, the generative model compression system 106 also determines a GAN minimax loss for a pruned noise-to-image GAN. In certain instances, the generative model compression system 106 utilizes a GAN training minimax objective to determine the GAN minimax loss. In addition, in some embodiments, the GAN training minimax objective utilizes a discriminator to generate a GAN minimax loss. For instance, the generative model compression system 106 utilizes a discriminator that functions as a classifier within the pruned GAN to classify a digital image (e.g., a portrait image of a person) as real data or synthesized data that is generated by the pruned GAN (e.g., classify between real images and synthesized images). Indeed, in one or more embodiments, the generative model compression system 106 utilizes the GAN minimax loss (e.g., a discriminator loss) to indicate whether the output image from the pruned GAN is a real image or a synthesized (e.g., fake) image (e.g., to learn parameters of the pruned GAN to produce a more photorealistic image or a visually consistent image).

Furthermore, in one or more embodiments, the generative model compression system 106 utilizes the norm-based knowledge distillation loss, the perceptual knowledge distillation loss, and the GAN minimax loss to iteratively learn parameters for a distilled GAN to cause outputs of the distilled GAN to mimic outputs of a full-size noise-to-image GAN. For example, the generative model compression system 106 utilizes the norm-based knowledge distillation loss $\mathcal{L}_{KD}^{norm}$, the perceptual knowledge distillation loss $\mathcal{L}_{KD}^{per}$, and the GAN minimax loss $\mathcal{L}_{GAN}$ as a GAN training loss $\mathcal{L}$ to train a pruned GAN to generate a distilled GAN in accordance with the following function:

$$\mathcal{L} = \mathcal{L}_{GAN} + \mathcal{L}_{KD}^{norm} + \mathcal{L}_{KD}^{per}.$$

In some embodiments, the generative model compression system 106 further utilizes weights for one or more knowledge distillation losses to determine a combined GAN loss for learning a pruned GAN. More specifically, the generative model compression system 106 determines weights for the knowledge distillation losses to indicate more or less impact from a specific type of knowledge distillation loss during the learning process. Indeed, in some embodiments, the generative model compression system 106 receives values for the weights as hyperparameters from an admin user. In certain instances, the generative model compression system 106 automatically configures weights for the knowledge distillation losses to optimize the output of a pruned GAN that is being learned into a distilled GAN that generates outputs to accurately mimic outputs of a full-size noise-to-image GAN. For example, in one or more embodiments, the generative model compression system 106 utilizes weights λ and γ for the norm-based knowledge distillation loss $\mathcal{L}_{KD}^{norm}$ and the perceptual knowledge distillation loss $\mathcal{L}_{KD}^{per}$ to generate ac combined GAN loss in accordance with the following function:

$$\mathcal{L} = \mathcal{L}_{GAN} + \lambda \mathcal{L}_{KD}^{norm} + \gamma \mathcal{L}_{KD}^{per}.$$

Furthermore, in certain implementations, the generative model compression system 106 utilizes various combinations of the norm-based knowledge distillation loss, the perceptual knowledge distillation loss, and the GAN minimax loss to generate a combined GAN loss. For instance, in some embodiments, the generative model compression system 106 utilizes a combination of the perceptual knowledge distillation loss and the GAN minimax loss as the combined GAN loss. Furthermore, in one or more embodiments, the generative model compression system 106 utilizes a combination of the norm-based knowledge distillation loss and the perceptual knowledge distillation loss as the combined GAN loss.

As mentioned above, in some instances, the generative model compression system 106 utilizes the combined GAN loss (e.g., determined from a combination of the norm-based knowledge distillation loss, the perceptual knowledge distillation loss, and/or the GAN minimax loss) to generate a distilled GAN from a pruned GAN by learning parameters of the distilled GAN to accurately mimic a full-size noise-to-image GAN. In order to transfer knowledge from the full-size noise-to-image GAN to a pruned GAN to generate the distilled GAN, the generative model compression system 106, in some embodiments, iteratively determines a combined GAN loss and utilizes the combined GAN loss to train the pruned GAN to generate the distilled GAN (i.e., learn parameters of a distilled GAN).

Indeed, in one or more embodiments, to learn the pruned GAN, the generative model compression system 106 learns (or adjusts) one or more parameters of a pruned GAN based on the combined GAN loss and utilizes the pruned GAN with the adjusted parameters to generate an additional output. Then, in one or more embodiments, the generative model compression system 106 iteratively determines a new combined GAN loss (in accordance with one or more embodiments) and utilizes the new combined GAN loss to further learn (or adjust) parameters of the pruned GAN. In one or more embodiments, the generative model compression system 106 continues to learn (or adjust) parameters of the pruned GAN until the pruned GAN generates outputs that accurately mimic a full-size noise-to-image GAN (as indicated by the combined GAN loss).

In some instances, to determine that the pruned GAN generates outputs that accurately mimic a full-size noise-to-image GAN, the generative model compression system 106 utilizes a threshold loss. In particular, in one or more embodiments, the generative model compression system 106 continues to iteratively learn parameters of a pruned GAN until a resulting combined GAN loss satisfies a threshold loss (e.g., is below and/or meets the threshold loss). Furthermore, in one or more embodiments, the generative model compression system 106 utilizes the pruned GAN, having the optimized parameters based on the iterative training with the combined GAN loss, as the compact and effective distilled noise-to-image GAN.

As mentioned above, in one or more embodiments, the generative model compression system 106 utilizes a content aware knowledge distillation approach to generate a distilled GAN. In particular, in some embodiments, the generative model compression system 106 determines one or more knowledge distillation losses that correspond to specific content within images generated by a full-sized noise-to-image GAN and a pruned GAN (e.g., pruned in accordance with one or more embodiments). Indeed, in order to determine knowledge distillation losses that are specific to content within an image, in some embodiments, the generative model compression system 106 utilizes masks to isolate the content of interest (e.g., a foreground region) in the images prior to determining the knowledge distillation losses utilized for transforming a pruned GAN into a final distilled noise-to-image GAN.

Figure 6:
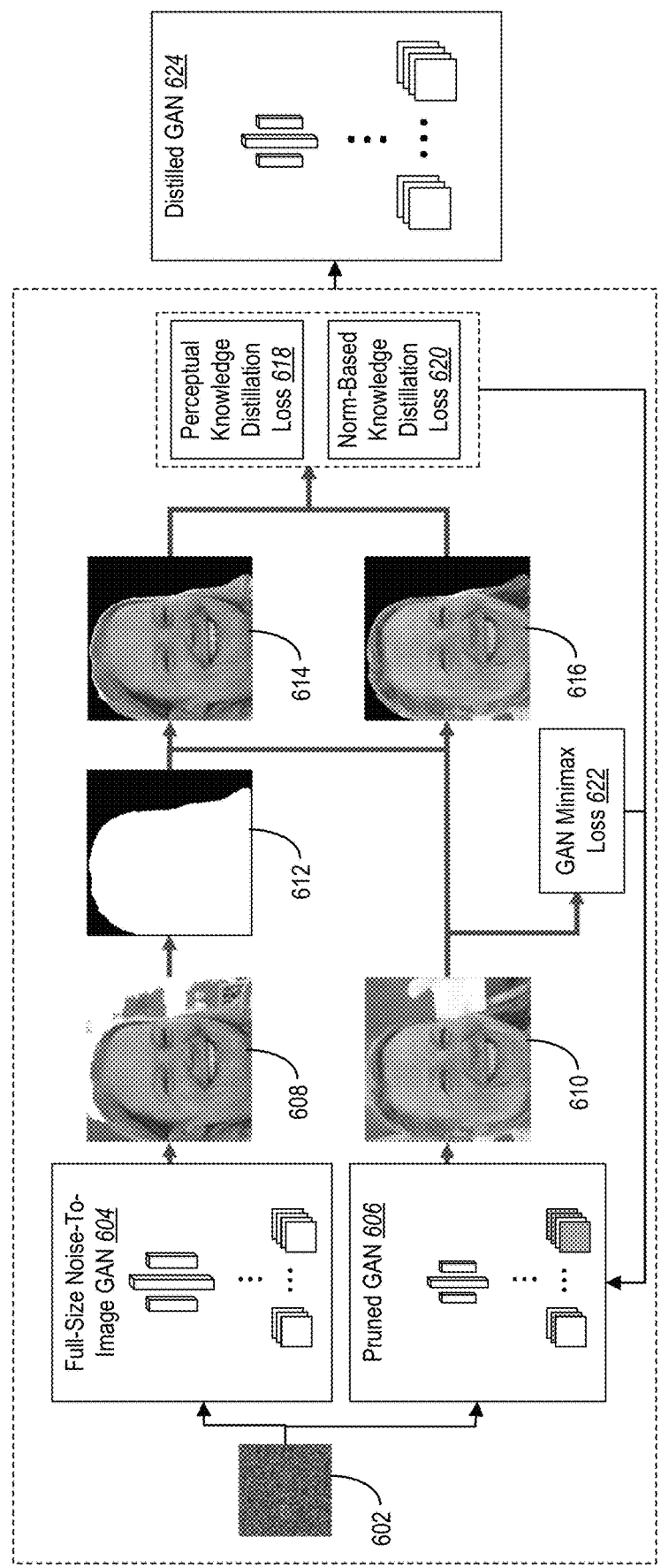
FIG. 6 illustrates a generative model compression system learning parameters of a distilled GAN utilizing a content aware knowledge distillation loss in accordance with one or more embodiments.

For instance, FIG. 6 illustrates the generative model compression system 106 utilizing content aware knowledge distillation losses to generate a distilled GAN from a pruned GAN by learning parameters for the distilled GAN utilizing the one or more content aware knowledge distillation losses. As shown in FIG. 6, the generative model compression system 106 inputs noise 602 into a full-size noise-to-image GAN 604 to generate an image 608. In addition, as illustrated in FIG. 6, the generative model compression system 106 also inputs the noise 602 into a pruned GAN 606 to generate an image 610. Then, as further shown in FIG. 6, the generative model compression system 106 parses (or segments) the image 608 to identify a foreground region 612 of the image 608 (e.g., a region depicting a face). Utilizing the foreground region 612 of the image 608, the generative model compression system 106 further generates a foreground mask 614 for the image 608. Indeed, as shown in FIG. 6, the foreground mask 614 isolates content of interest of the image 608 (e.g., a face depicted in the foreground). Likewise, the generative model compression system 106 also generates a foreground mask 616 for the image 610.

Moreover, as illustrated in FIG. 6, the generative model compression system 106 compares the foreground mask 614 and the foreground mask 616 to determine a perceptual knowledge distillation loss 618 and a norm-based knowledge distillation loss 620 that is specific to the content of interest from the foreground mask 614 and the foreground mask 616. In addition, as shown in FIG. 6, the generative model compression system 106 also determines a GAN minimax loss 622 for the pruned GAN 606 in relation to the generated image 610.

Then, as shown in FIG. 6, the generative model compression system 106 iteratively learns parameters for a distilled GAN 624 utilizing the perceptual knowledge distillation loss 618, the norm-based knowledge distillation loss 620, and/or the GAN minimax loss 622. Indeed, in one or more embodiments and in relation to FIG. 6, the generative model compression system 106 updates the parameters for the pruned GAN 606 utilizing the perceptual knowledge distillation loss 618, the norm-based knowledge distillation loss 620, and the GAN minimax loss 622 to generate a distilled GAN 624 that generates outputs that accurately mimic outputs of the full-sized noise-to-image GAN 604 (in relation to the isolated content in the foreground mask 614 and the foreground mask 616). The resulting pruned and distilled GAN (e.g., the distilled GAN 624) is compact and effectively operates to generate outputs that are materially similar to outputs of a full-size noise-to-image GAN.

As just mentioned, the generative model compression system 106 determines foreground masks for output images from both a full-size noise-to-image GAN and a pruned GAN. In particular, in one or more embodiments, the generative model compression system 106 utilizes a parsing (or segmentation) model and/or tool to determine a foreground region of an image (as described above). For example, as described above, the generative model compression system 106 determines a foreground of an image to identify a salient object or person in the foreground of the image.

In one or more embodiments, the generative model compression system 106 parses an image to segment a face depicted within the image (e.g., in the foreground region of the image) for the content aware knowledge distillation process. For instance, as described above, the generative model compression system 106 utilizes various parsing (or segmentation) models and/or tools specific to the detection of faces portrayed within images. In some implementations, the generative model compression system 106 can also utilize one or more parsing models to detect other objects (e.g., animals, buildings, vehicles, clothes, landscapes).

In addition, upon detecting a foreground region within an output image (e.g., a face or other content depicted within the image), the generative model compression system 106 generates a foreground mask for the image. In one or more embodiments, the generative model compression system 106 generates a foreground mask that represents a digital object (or layer) reflecting selected pixels in an image. For instance, the foreground mask includes a boundary, matrix, array, index, digital file, or other set of pixels that reflect selected one or more regions of an image. In some embodiments, a mask includes a set of pixels (e.g., within a matrix or digital file) that correspond to selected regions (e.g., foregrounds, faces, salient objects) portrayed in an image. To further illustrate, in one or more implementations, when generating a mask, the generative model compression system 106 segments the pixels of a selected region from the other pixels in the image. For example, the generative model compression system 106 creates a separate image layer that sets the pixels corresponding to the selected region to positive (e.g., binary 1) while setting the remaining pixels from the image to a neutral or negative (e.g., binary 0). When this foreground mask layer is combined with the image, only the pixels of the detected region are visible (e.g., a detected foreground region that portrays a face).

In particular, in one or more embodiments, the generative model compression system 106 generates a foreground mask from an image by including pixels of the image that correspond to the identified foreground region of the image while ignoring (or removing) pixels of the image that correspond to a background region of the image. In some implementations, the generative model compression system 106 generates the foreground mask from the image by including pixels of the image that correspond to an identified face portrayed within the image while ignoring (or removing) pixels of the image that do not correspond to the depicted face (e.g., a background region). By doing so, in one or more embodiments, the generative model compression system 106 generates a foreground mask that isolates content that is taken into account for a content aware knowledge distillation loss (to generate a distilled GAN in accordance with one or more embodiments).

As also mentioned above, in one or more embodiments, the generative model compression system 106 compares the foreground masks (from the images generated by the full-size noise-to-image and the pruned GAN) to determine one or more content aware knowledge distillation losses. In one or more embodiments, the generative model compression system 106 compares the foreground masks of the images to determine a content aware norm-based knowledge distillation loss. Indeed, in certain instances, the generative model compression system 106 determines an output-focused norm-based knowledge distillation loss and/or an intermediate norm-based knowledge distillation loss that is content aware between the foreground masks corresponding to images output by both a full-size noise-to-image GAN and a pruned GAN. More specifically, in one or more implementations, the generative model compression system 106 determines one or more content aware norm-based knowledge distillation losses utilizing the one or more loss functions described above (e.g., the output-focused norm-based loss and/or an intermediate norm-based loss functions in relation to FIG. 5) between the foreground masks corresponding to the full-size noise-to-image GAN and the pruned GAN.

Moreover, in some embodiments, the generative model compression system 106 compares the foreground masks of images (corresponding to the full-size noise-to-image GAN and the pruned GAN) to determine a content aware perceptual knowledge distillation loss. More specifically, in one or more embodiments, the generative model compression system 106 determines a content aware perceptual knowledge distillation loss between foreground masks that represents a measure of low-level visual detail differences and also high-level semantic differences between the content within the foreground masks. In certain instances, the generative model compression system 106 determines the content aware perceptual knowledge distillation loss by measuring a learned perceptual image patch similarity (LPIPS) metric between the foreground masks. In one or more embodiments, the generative model compression system 106 determines a content aware perceptual knowledge distillation loss utilizing the loss function described above (e.g., perceptual knowledge distillation loss function in relation to FIG. 5) between the foreground masks corresponding to the full-size noise-to-image GAN and the pruned GAN.

As also mentioned above, in some embodiments, the generative model compression system 106 determines a GAN minimax loss for a pruned GAN in relation to a generated image. In particular, in one or more embodiments, the generative model compression system 106 determines the GAN minimax loss for the pruned GAN utilizing the non-masked image generated by the pruned GAN. Indeed, in certain implementations, the generative model compression system 106 determines the GAN minimax loss for the pruned GAN as described above (e.g., in relation to FIG. 5).

Additionally, in one or more embodiments, the generative model compression system 106 utilizes the content aware norm-based knowledge distillation loss, the content aware perceptual knowledge distillation loss, and the GAN minimax loss to iteratively learn parameters for a distilled GAN to cause outputs of the distilled GAN to mimic outputs of a full-size noise-to-image GAN. Indeed, in certain instances, the generative model compression system 106 combines the content aware norm-based knowledge distillation loss $\mathcal{L}_{CA\_KD}^{norm}$, the content aware perceptual knowledge distillation loss $\mathcal{L}_{CA\_KD}^{per}$, and the GAN minimax loss $\mathcal{L}_{GAN}$ as a combined GAN loss $\mathcal{L}$ to update parameters of a pruned GAN to generate a distilled GAN in accordance with the following function:

$$\mathcal{L} = \mathcal{L}_{GAN} + \mathcal{L}_{CA\_KD}^{norm} + \mathcal{L}_{CA\_KD}^{per}.$$

Furthermore, in one or more embodiments, the generative model compression system 106 also utilizes weights for the one or more content aware knowledge distillation losses to determine a combined GAN loss as described above (e.g., in relation to FIG. 5).

Moreover, in some implementations, the generative model compression system 106 utilizes various combinations of the content aware norm-based knowledge distillation loss, the content aware perceptual knowledge distillation loss, and the GAN minimax loss to generate a combined GAN loss. For example, the generative model compression system 106 utilizes a combination of the content aware perceptual knowledge distillation loss and the GAN minimax loss as the combined GAN loss. Furthermore, in some instances, the generative model compression system 106 utilizes a combination of the content aware norm-based knowledge distillation loss and the content aware perceptual knowledge distillation loss as the combined GAN loss.

In addition, in one or more embodiments, the generative model compression system 106 utilizes the combined GAN loss (e.g., determined from a combination of the content aware norm-based knowledge distillation loss, the content aware perceptual knowledge distillation loss, and the GAN minimax loss) to generate a distilled GAN from a pruned GAN by learning parameters of the distilled GAN to accurately mimic a full-size noise-to-image GAN. For instance, to transfer knowledge from the full-size noise-to-image GAN to a pruned GAN to generate the distilled GAN using the content aware foreground masks, the generative model compression system 106, in one or more embodiments, iteratively determines a combined GAN loss and utilizes the combined GAN loss to update parameters of the pruned GAN to generate the distilled GAN (i.e., learn parameters of a distilled GAN). Indeed, in certain instances, the generative model compression system 106 learns (or adjusts) one or more parameters of a pruned GAN based on the content aware combined GAN loss to generate a distilled GAN as described above (e.g., in relation to FIG. 5).

Additionally, although one or more embodiments illustrate the generative model compression system 106 parsing faces for content aware pruning (and distillation) of the noise-to-image GAN, the generative model compression system 106, in one or more embodiments, detects a variety of objects (e.g., animals, buildings, vehicles, clothes, landscapes) and utilizes the detected objects during content aware pruning of the noise-to-image GAN.

Although one or more embodiments herein illustrate the generative model compression system 106 utilizing a content aware knowledge distillation loss that corresponds to a face depicted within an image, the generative model compression system 106, in some implementations, utilizes content aware knowledge distillation for various subjects (e.g., objects, text, animals) depicted within images. For example, the generative model compression system 106 parses images generated by a noise-to-image GAN and a pruned GAN to identify a subject as the content of interest. Subsequently, in some embodiments, the generative model compression system 106 generates foreground masks for the images and then determines one or more content aware knowledge distillation losses between the foreground masks. Additionally, in one or more embodiments, the generative model compression system 106 utilizes the one or more content aware knowledge distillation losses to learn parameters of a distilled GAN in accordance with one or more embodiments.

Figure 7:
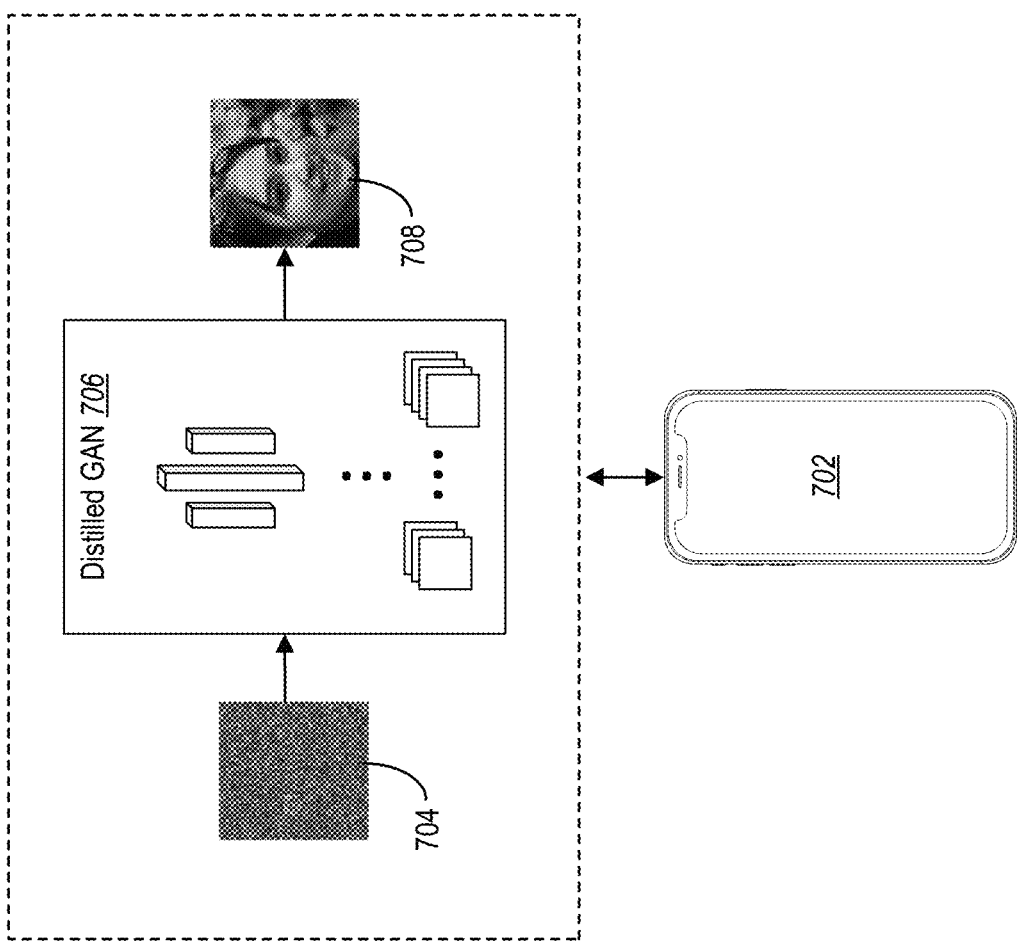
FIG. 7 illustrates a generative model compression system utilizing a distilled GAN in accordance with one or more embodiments.

As mentioned above, in one or more embodiments, the generative model compression system 106 utilizes a compact and effective pruned and distilled GAN. For instance, FIG. 7 illustrates the generative model compression system 106 utilizing a generated distilled GAN on a mobile device. In particular, as shown in FIG. 7, the generative model compression system 106 deploys a distilled GAN 706 (generated in accordance with one or more embodiments herein) on a mobile device 702. Indeed, as further shown in FIG. 7, the generative model compression system 106 operates (or causes the mobile device 702 to operate) the distilled GAN 706 to generate an image 708. In particular, as shown in FIG. 7, the condensed and efficient distilled GAN 706 generates the image 708 from input noise 704 directly (locally) on the mobile device 702. In one or more embodiments, the generative model compression system 106 generates a distilled GAN that is compact and able to operate locally within a mobile device while achieving output performance that accurately mimics output performance of a full-size noise-to-image GAN.

In addition, in one or more embodiments, the generative model compression system 106 utilizes the distilled GAN (locally on a mobile device) for a variety of computer vision tasks. For instance, the generative model compression system 106 utilizes the distilled GAN to edit images (or videos). As an example, the generative model compression system 106 utilizes the distilled GAN to modify images by introducing visual content and/or visual properties of the image (e.g., lighting, color, perspective) to the images. In one or more embodiments, the generative model compression system 106 utilizes the distilled GAN to modify images by transferring visual attributes or portions of one image to another image. Furthermore, in some embodiments, the generative model compression system 106 utilizes the distilled GAN to modify elements of an image to modify the visually depicted content of the image.

Although one or more embodiments describe the generative model compression system 106 deploying and utilizing the generated distilled GAN on a mobile device, the generative model compression system 106, in some embodiments, utilizes a distilled GAN in a variety of other types of computing devices. For example, the generative model compression system 106 utilizes the distilled GAN via server device(s) 102 to generate and/or modify images (or other content) over a network connection. In particular, in some instances, the generative model compression system 106 utilizes the distilled GAN to generate and/or modify images via a cloud service.

As mentioned above, the generative model compression system 106 generates a pruned and distilled noise-to-image GAN that is compact (e.g., utilizes less computational resources) while being as effective as a full-size noise-to-image GAN. For example, experimenters utilized a distilled GAN in accordance with one or more embodiments to compare results with a full-size noise-to-image GAN (e.g., the StyleGAN2). In particular, the experimenters trained the various GANs to project images that belonged to a test image dataset (e.g., the Flickr-Faces-HQ (FFHQ) dataset) and then measured accuracies between the projected images (from the GANs) and the original images to determine the one or more accuracy metrics. Indeed, the distilled GAN, generated in accordance with one or more embodiments, generated images that accurately mimic a full-size noise-to-image GAN with improved efficiency in computing resources.

For example, the following Table 1 demonstrates Fréchet Inception Distances (FID) on outputs from a pruned GAN that is pruned in accordance with one or more embodiments herein compared to a baseline full-size noise-to-image GAN, randomly pruned GAN, and a pruned GAN with reinitialized weight training. For fairness of comparison, the experimenters used the same dataset and FID evaluation across each GAN and also limited pruning to 30% for each pruned GAN. As shown by Table 1, the L1-outgoing weight pruned GAN (generated in accordance with one or more embodiments) only experienced a 0.9 FID drop from the baseline full-size noise-to-image GAN while having less than half the floating point operations per second (FLOPs). In addition, as shown by Table 1, the L1-outgoing weight pruned GAN (generated in accordance with one or more embodiments) also outperformed the two other pruning approaches.

TABLE 1

| Model | Image Size | FLOPs | FID |
| --- | --- | --- | --- |
| Baseline | 256 | 45.1 B | 4.5 |
| Pruning (Trained) | 256 | 22.3 B | 7.8 |
| Random Pruning | 256 | 22.3 B | 6.2 |
| L1-outgoing weight Pruning | 256 | 22.3 B | 5.4 |

In addition, the following Table 2 demonstrates FID, Perceptual Path Length (PPL), Peak Signal-to-noise Ratio Decibel Loss (PSNR), and Learned Perceptual Image Patch Similarity (LPIPS) measurements on outputs of a knowledge distilled GAN (using various combinations of norm-based and perceptual knowledge distillation losses in accordance with one or more embodiments) in comparison to a baseline full-size noise-to-image GAN. Indeed, as shown by Table 2, implementations of the generative model compression system 106 result in compact and effective distilled GANs that operate with 11 times less FLOPs while only seeing insubstantial drops in performance. For instance, as shown by Table 2, a distilled GAN generated by the generative model compression system 106 utilizing an output-focused norm-based knowledge distillation loss and a perceptual knowledge distillation loss (in accordance with one or more embodiments) results in a distilled GAN that is 11×-accelerated compared to the baseline full-size noise-to-image GAN while only experiencing a 1.06 db PSNR loss compared to the baseline full-size noise-to-image GAN. In addition, the implementations of the generative model compression system 106 resulted distilled GANs that operate with an inference speed up of 4.4 time for image generation and 3.1 times speed up for image projection compared to the baseline full-size noise-to-image GAN.

TABLE 2

| Model | Image Size | $\mathcal{L}_{KD}^{per}$ Type | FLOPs | FID | PPL | PSNR | LPIPS |
|---|---|---|---|---|---|---|---|
| Baseline GAN | 256 | — | 45.1B | 4.5 | 0.162 | 31.76 | 0.116 |
| No KD (Pruned) GAN | 256 | — | 4.1B | 8.8 | 0.151 | 30.46 | 0.167 |
| $\mathcal{L}_{KD}^{norm}$ GAN | 256 | Intermediate | 4.1B | 9.0 | 0.145 | 30.28 | 0.173 |
| $\mathcal{L}_{KD}^{norm} + \mathcal{L}_{KD}^{per}$ GAN | 256 | Intermediate | 4.1B | 9.0 | 0.139 | 30.46 | 0.164 |
| $\mathcal{L}_{KD}^{norm} + \mathcal{L}_{KD}^{per}$ GAN | 256 | Output | 4.1B | 8.9 | 0.143 | 30.70 | 0.157 |

Furthermore, the following Table 3 demonstrates Peak Signal-to-noise Ratio Decibel Loss (PSNR) and Learned Perceptual Image Patch Similarity (LPIPS) measurements on outputs of a knowledge distilled GAN using various combinations of norm-based and perceptual knowledge distillation losses (in accordance with one or more embodiments) in comparison to a baseline full-size noise-to-image GAN that generates images having a 1024 pixel resolution. Indeed, as shown by Table 3, implementations of the generative model compression system 106 result distilled GANs that also operate with 11 times less FLOPs while only seeing insubstantial drops in performance. For example, as shown by Table 3, the distilled GAN generated by the generative model compression system 106 utilizing a norm-based knowledge distillation loss and a perceptual knowledge distillation loss (in accordance with one or more embodiments) results in a distilled GAN that is more than 10×-accelerated compared to the baseline full-size noise-to-image GAN while only experiencing a 0.81 db PSNR loss compared to the baseline full-size noise-to-image GAN.

TABLE 3

| Model | Image Size | $\mathcal{L}_{KD}^{per}$ Type | FLOPs | PSNR | LPIPS |
|---|---|---|---|---|---|
| Baseline GAN | 1024 | — | 74.3 B | 31.15 | 0.152 |
| No KD (Pruned) GAN | 1024 | — | 7.0 B | 29.98 | 0.202 |
| $\mathcal{L}_{KD}^{norm}$ GAN | 1024 | Output | 7.0 B | 30.25 | 0.193 |
| $\mathcal{L}_{KD}^{norm} + \mathcal{L}_{KD}^{per}$ GAN | 1024 | Output | 7.0 B | 30.34 | 0.182 |

Moreover, the following Table 4 demonstrates PSNR, LPIPS, Content Aware PSNR (CA-PSNR), and Content Aware LPIPS (CA-LPIPS) measurements on outputs of a knowledge distilled GAN using various combinations of norm-based and perceptual knowledge distillation losses (in accordance with one or more embodiments) in comparison to a baseline full-size noise-to-image GAN. In one or more embodiments, the experimenters measured CA-PSNR and CA-LPIPS metrics by segmenting test images and the corresponding projected images (from the various GANs) to generate foreground masks for the images (e.g., to isolate a face depicted within the images). Then, the experimenters measured the PSNR and LPIPS metrics between the test foreground mask and the projected foreground mask to determine the CA-PSNR and CA-LPIPS.

As shown by Table 4, implementations of the generative model compression system 106 that utilized content aware pruning and distillation resulted in distilled GANs that operated with increasing efficiency and accuracy compared to a full-size noise-to-image GAN. For instance, as shown by Table 4, the distilled GAN generated by the generative model compression system 106 by utilizing a content aware norm-based and content aware perceptual knowledge distillation loss (in accordance with one or more embodiments) results in a distilled GAN that is 11×-accelerated compared to the baseline full-size noise-to-image GAN while only experiencing a 0.59 db PSNR loss compared to the baseline full-size noise-to-image GAN.

TABLE 4

| Model Baseline | Image Size | $\mathcal{L}_{KD}^{per}$ Type | FLOPs | PSNR | LPIPS | CA-PSNR | CA-LPIPS |
|---|---|---|---|---|---|---|---|
| GAN | 256 | — | 45.1B | 31.76 | 0.116 | 32.71 | 0.092 |
| $\mathcal{L}_{KD}^{norm} + \mathcal{L}_{KD}^{per}$ GAN | 256 | Output | 4.1B | 30.70 | 0.157 | 31.99 | 0.121 |
| $\mathcal{L}_{CA\_KD}^{norm} + \mathcal{L}_{CA\_KD}^{per}$ GAN | 256 | Output | 4.1B | 30.74 | 0.153 | 32.12 | 0.117 |

Figure 8:
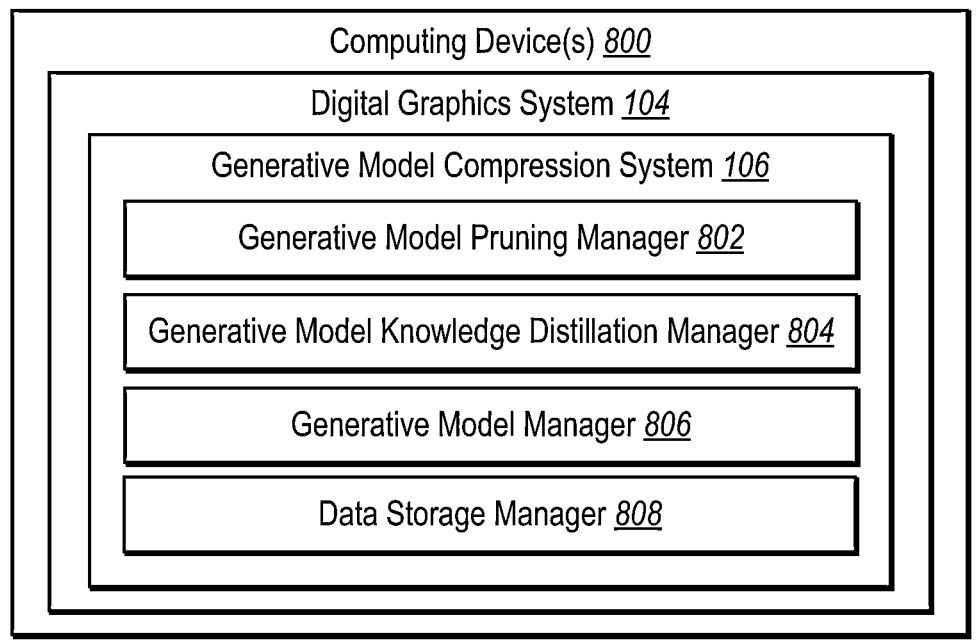
FIG. 8 illustrates a schematic diagram of a generative model compression system in accordance with one or more embodiments.

Turning now to FIG. 8, additional detail will be provided regarding components and capabilities of one or more embodiments of the generative model compression system. In particular, FIG. 8 illustrates an example generative model compression system 106 executed by a computing device 800 (e.g., the server device(s) 102 or the client device 110). As shown by the embodiment of FIG. 8, the computing device 800 includes or hosts the digital graphics system 104 and the generative model compression system 106. Furthermore, as shown in FIG. 8, the generative model compression system 106 includes a generative model pruning manager 802, a generative model knowledge distillation manager 804, a generative model manager 806, and a data storage manager 808.

As just mentioned, and as illustrated in the embodiment of FIG. 8, the generative model compression system 106 includes the generative model pruning manager 802. For example, the generative model pruning manager 802 prunes channels of a noise-to-image GAN based on outgoing channel weights of the channels as described above (e.g., in relation to FIG. 3). Furthermore, in one or more embodiments, the generative model pruning manager 802 prunes channels of a noise-to-image GAN upon backpropagating a content aware differentiable loss from between the image and the foreground-modified image into the noise-to-image GAN as described above (e.g., in relation to FIGS. 4A and 4B).

Furthermore, as shown in FIG. 8, the generative model compression system 106 includes the generative model knowledge distillation manager 804. For instance, the generative model knowledge distillation manager 804 generates a distilled GAN from a pruned GAN by learning parameters for the distilled GAN that cause outputs of the distilled GAN to mimic outputs of the noise-to-image GAN utilizing one or more knowledge distillation losses as described above (e.g., in relation to FIG. 5). In addition, in some embodiments, the generative model knowledge distillation manager 804 generates a distilled GAN from a pruned GAN by learning parameters for the distilled GAN utilizing a content aware knowledge distillation loss between foreground masks of images generated by both the pruned GAN and a full-sized noise-to-image GAN as described above (e.g., in relation to FIG. 6).

In addition, as shown in FIG. 8, the generative model compression system 106 includes the generative model manager 806. In certain instances, the generative model manager 806 utilizes a pruned (and distilled) GAN to generate and/or modify one or more images as described above (e.g., in relation to FIG. 7). Furthermore, in some embodiments, the generative model manager 806 deploys a pruned (and distilled) GAN onto a mobile device to operate the pruned (and distilled) GAN on the mobile device as described above (e.g., in relation to FIG. 7).

Moreover, as shown in FIG. 8, the generative model compression system 106 includes the data storage manager 808. In one or more embodiments, the data storage manager 808 is implemented by one or more memory devices. Moreover, in some embodiments, the data storage manager 808 maintains data to perform one or more functions of the generative model compression system 106. For example, the data storage manager 808 includes image data (e.g., input noise, output images, foreground-modified images, foreground masks) and machine learning data (e.g., GAN data, outgoing channel weights, gradients for outgoing channel weights, differentiable losses, knowledge distillation losses, GAN parameters, pruned GAN data, distilled GAN data, segmentation model data).

Each of the components 802-808 of the computing device 800 (e.g., the computing device 800 implementing the generative model compression system 106), as shown in FIG. 8, may be in communication with one another using any suitable technology. The components 802-808 of the computing device 800 can comprise software, hardware, or both. For example, the components 802-808 can comprise one or more instructions stored on a computer-readable storage medium and executable by processor of one or more computing devices. When executed by the one or more processors, the computer-executable instructions of the generative model compression system 106 (e.g., via the computing device 800) can cause a client device and/or server device to perform the methods described herein. Alternatively, the components 802-808 and their corresponding elements can comprise hardware, such as a special purpose processing device to perform a certain function or group of functions. Additionally, the components 802-808 can comprise a combination of computer-executable instructions and hardware.

Furthermore, the components 802-808 of the generative model compression system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-808 may be implemented as a stand-alone application, such as a desktop or mobile application. Furthermore, the components 802-808 may be implemented as one or more web-based applications hosted on a remote server. The components 802-808 may also be implemented in a suite of mobile device applications or "apps." To illustrate, the components 802-808 may be implemented in an application, including but not limited to, ADOBE PHOTOSHOP, ADOBE PREMIERE, ADOBE LIGHTROOM, ADOBE ILLUSTRATOR, or ADOBE SUBSTANCE. "ADOBE," "ADOBE PHOTOSHOP," "ADOBE PREMIERE," "ADOBE LIGHTROOM," "ADOBE ILLUSTRATOR," or "ADOBE SUBSTANCE" are either registered trademarks or trademarks of Adobe Inc. in the United States and/or other countries.

Figure 9:
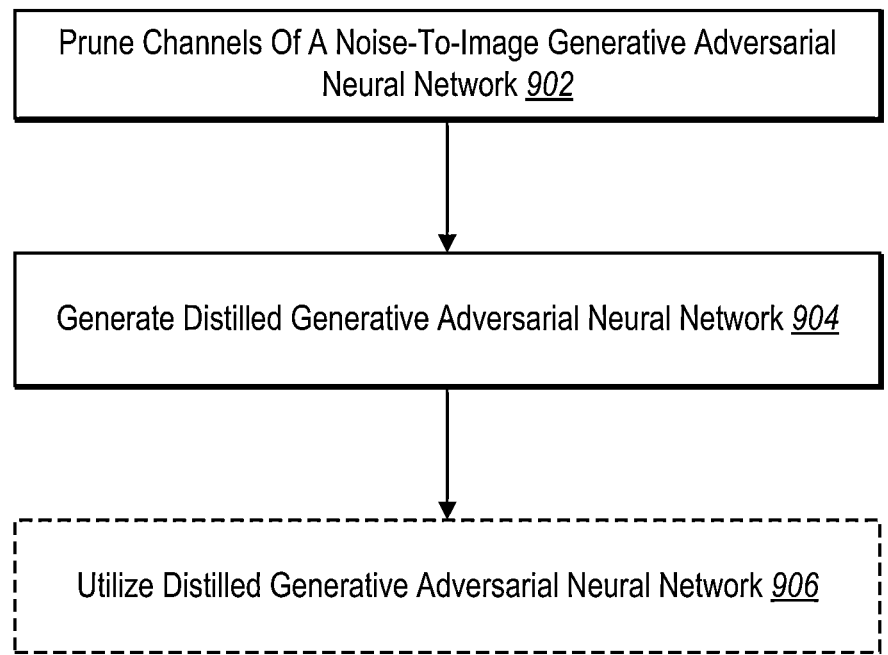
FIG. 9 illustrates a flowchart of a series of acts for generating a pruned and distilled noise-to-image GAN in accordance with one or more embodiments.

FIGS. 1-8, the corresponding text, and the examples provide a number of different methods, systems, devices, and non-transitory computer-readable media of the generative model compression system 106. In addition to the foregoing, one or more embodiments can also be described in terms of flowcharts comprising acts for accomplishing a particular result, as shown in FIG. 9. The acts shown in FIG. 9 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 9. In some embodiments, a system can be configured to perform the acts of FIG. 9. Alternatively, the acts of FIG. 9 can be performed as part of a computer-implemented method.

As mentioned above, FIG. 9 illustrates a flowchart of a series of acts 900 for generating a pruned and distilled noise-to-image GAN in accordance with one or more embodiments. While FIG. 9 illustrates acts according to one embodiment, alternative embodiments may omit, add to, reorder, and/or modify any of the acts shown in FIG. 9.

As shown in FIG. 9, the series of acts 900 include an act 902 of pruning channels of a noise-to-image generative adversarial neural network (GAN). In particular, in one or more embodiments, the act 902 include pruning channels of a noise-to-image GAN based on outgoing channel weights corresponding to the channels to generate a pruned GAN. Furthermore, in one or more embodiments, the act 902 includes determining normalized outgoing channel weights from the outgoing channel weights of the channels by determining L1-norms of the outgoing channel weights. In addition, in some embodiments, the act 902 includes pruning channels of a noise-to-image GAN to generate a pruned GAN by selecting, from the channels, a channel having an outgoing channel weight that does not satisfy a threshold outgoing channel weight and removing the selected channel from the noise-to-image GAN. Moreover, in some instances, the act 902 includes removing filters corresponding to pruned channels of a noise-to-image GAN to generate a pruned GAN.

In one or more embodiments, the act 902 includes pruning a noise-to-image GAN to generate a pruned GAN by selecting, from a set of channels, a subset of channels having outgoing channel weights that do not satisfy a threshold outgoing channel weight and removing the subset of channels from the noise-to-image GAN. In certain instances, the act 902 includes selecting a subset of channels (from a set of channels of a noise-to-image GAN) having outgoing channel weights that do not exceed a threshold outgoing channel weight. For example, an outgoing channel weight includes an outgoing L1-norm for the outgoing channel weight of the channel.

In some embodiments, the act 902 includes determining (or identify) gradients for outgoing channel weights corresponding to channels (of a noise-to-image GAN) by back-propagating, within the noise-to-image GAN, a differentiable loss (from between an image generated utilizing the noise-to-image GAN and a foreground-modified image corresponding to the image). Furthermore, in some embodiments, the act 902 includes pruning channels of a noise-to-image GAN based on gradients for outgoing channel weights corresponding to the channels to generate a pruned GAN. Indeed, in one or more embodiments, the act 902 includes generating a pruned GAN by pruning channels of a noise-to-image GAN based on gradients for outgoing channel weights corresponding to channels upon a back-propagation of a differentiable loss between an image and a foreground-modified image within the noise-to-image GAN. In certain implementations, the act 902 includes pruning channels of a noise-to-image GAN by removing one or more channels corresponding to gradients of outgoing channel weights that do not satisfy a threshold gradient. For example, a threshold gradient indicates channel sensitivity to a foreground-modified image.

Additionally, in some instances, the act 902 includes modifying a foreground region of an image generated from a noise-to-image GAN to generate a foreground-modified image. In some embodiments, the act 902 includes modifying a foreground region of an image to generate a foreground-modified image by applying noise pixels within the foreground region of the image. Furthermore, in one or more embodiments, the act 902 includes parsing a face depicted within an image as a foreground region of the image. Moreover, in some implementations, the act 902 includes comparing an image and a foreground-modified image to determine a differentiable loss between the image and the foreground-modified image.

As shown in FIG. 9, the series of acts 900 include an act 904 of generating a distilled generative adversarial neural network (GAN). In particular, in one or more embodiments, the act 904 includes generating a distilled GAN from a pruned GAN by learning parameters for the distilled GAN that cause outputs of the distilled GAN to mimic outputs of a noise-to-image GAN. In some implementations, the act 904 includes generating a distilled GAN from a pruned GAN by learning parameters for the distilled GAN based on at least one knowledge distillation loss between an output of a noise-to-image GAN and an output of a pruned GAN. For example, a knowledge distillation loss includes a norm-based knowledge distillation loss and/or a perceptual knowledge distillation loss.

Moreover, in one or more embodiments, the act 904 includes generating a distilled GAN from a pruned GAN by comparing outputs of a noise-to-image GAN and outputs of a pruned GAN to determine at least one knowledge distillation loss. Furthermore, in some instances, the act 904 includes learning one or more parameters of a distilled GAN based on at least one knowledge distillation loss to cause the distilled GAN to generate an output that mimics an output of a noise-to-image GAN. For instance, the at least one knowledge distillation loss includes a combination of a norm-based knowledge distillation loss and a perceptual knowledge distillation loss from comparing outputs of a noise-to-image GAN and outputs of a pruned GAN. Furthermore, in one or more embodiments, the act 904 includes learning (or adjusting) one or more parameters of a distilled GAN until at least one knowledge distillation loss satisfies a threshold knowledge distillation loss. For instance, a threshold knowledge distillation loss indicates that an output of a distilled GAN mimics an output of a noise-to-image GAN.

In some embodiments, the act 904 includes generating a distilled GAN from a pruned GAN by learning (or adjusting) parameters for the distilled GAN by utilizing at least one knowledge distillation loss between a foreground mask from an image (generated utilizing a noise-to-image GAN) and an additional foreground mask from an additional image (generated utilizing a pruned GAN). Indeed, in some instances, the act 904 includes utilizing a pruned GAN to generate an additional image. Furthermore, in one or more embodiments, the act 904 includes determining at least one knowledge distillation loss by comparing a foreground mask from an image (generated utilizing a noise-to-image GAN) and an additional foreground mask from an additional image (generated utilizing a pruned GAN). In some implementations, the act 904 includes learning parameters for a distilled GAN utilizing a combination of a norm-based knowledge distillation loss between a foreground mask from an image (generated utilizing a noise-to-image GAN) and an additional foreground mask from an additional image and a perceptual knowledge distillation loss between the foreground mask from image and the additional foreground mask from the additional image. Furthermore, in some embodiments, the act 904 includes learning parameters for a distilled GAN utilizing a GAN minimax loss from an additional image generated by a pruned GAN.

As shown in FIG. 9, in some implementations, the series of acts 900 include an act 906 of utilizing a distilled generative adversarial neural network (GAN). In particular, in one or more embodiments, the act 906 includes providing a distilled GAN to a mobile device to cause the mobile device to implement the distilled GAN. In some embodiments, the act 906 includes providing a distilled GAN to a mobile device to cause the mobile device to generate and/or modify an image utilizing the distilled GAN.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
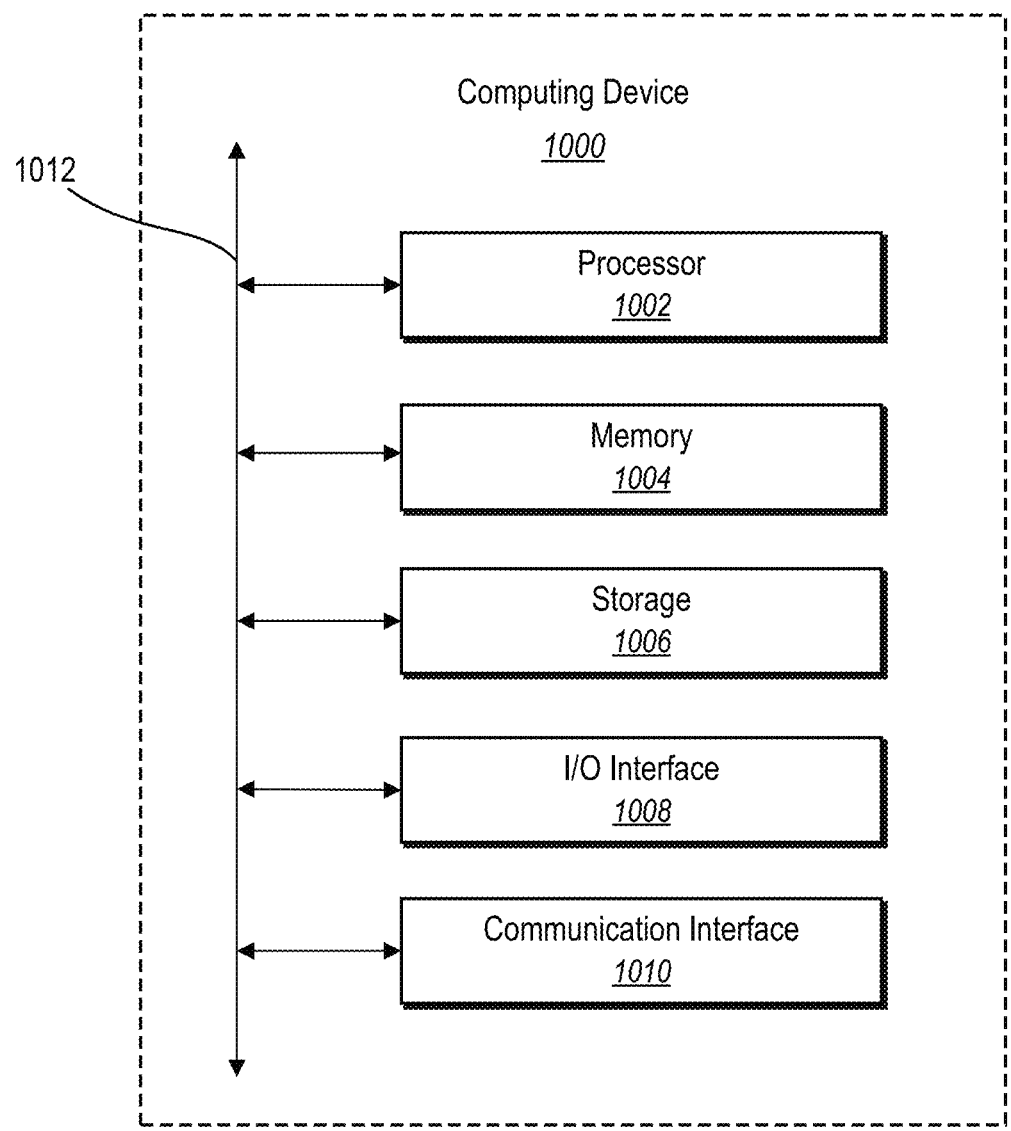
FIG. 10 illustrates a block diagram of an example computing device in accordance with one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., computing device 800, server device(s) 102, and client device 110). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive ("HDD"), flash memory, a Universal Serial Bus ("USB") drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller ("NIC") or network adapter for communicating with an Ethernet or other wire-based network or a wireless NIC ("WNIC") or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computer device to:
   prune channels of a noise-to-image generative adversarial neural network (GAN) based on outgoing channel weights corresponding to the channels to generate a pruned GAN; and
   generate a distilled GAN from the pruned GAN by learning parameters for the distilled GAN that cause outputs of the distilled GAN to mimic outputs of the noise-to-image GAN utilizing at least one knowledge distillation loss between:
      a foreground mask from an image generated utilizing the noise-to-image GAN; and
      an additional foreground mask from an additional image generated utilizing the pruned GAN.

2. The non-transitory computer-readable medium of claim 1, further comprising instructions that, when executed by the at least one processor, cause the computer device to determine normalized outgoing channel weights from the outgoing channel weights of the channels by determining L1-norms of the outgoing channel weights.

3. The non-transitory computer-readable medium of claim 1, further comprising instructions that, when executed by the at least one processor, cause the computer device to prune the channels of the noise-to-image GAN to generate the pruned GAN by:
   selecting, from the channels, a channel comprising an outgoing channel weight that does not satisfy a threshold outgoing channel weight; and
   removing the selected channel from the noise-to-image GAN.

4. The non-transitory computer-readable medium of claim 1, further comprising instructions that, when executed by the at least one processor, cause the computer device to remove filters corresponding to the pruned channels of the noise-to-image GAN to generate the pruned GAN.

5. The non-transitory computer-readable medium of claim 1, further comprising instructions that, when executed by the at least one processor, cause the computer device to generate the distilled GAN from the pruned GAN by learning the parameters for the distilled GAN based on a norm-based knowledge distillation loss or a perceptual knowledge distillation loss.

6. The non-transitory computer-readable medium of claim 1, further comprising instructions that, when executed by the at least one processor, cause the computer device to:
   determine gradients for outgoing channel weights corresponding to the channels by backpropagating, within the noise-to-image GAN, a differentiable loss from between a particular image generated utilizing the noise-to-image GAN and a foreground-modified image corresponding to the particular image; and
   prune the channels of the noise-to-image GAN based on the gradients for the outgoing channel weights corresponding to the channels to generate the pruned GAN.

7. The non-transitory computer-readable medium of claim 1, further comprising instructions that, when executed by the at least one processor, cause the computer device to generate the foreground mask based on a salient object portrayed within the image generated utilizing the noise-to-image GAN.

8. The non-transitory computer-readable medium of claim 1, further comprising instructions that, when executed by the at least one processor, cause the computer device to provide the distilled GAN to a mobile device to cause the mobile device to implement the distilled GAN.

9. A system comprising:
   one or more memory devices comprising a noise-to-image generative adversarial neural network (GAN) comprising a set of channels; and
   one or more processors configured to cause the system to:
   prune the noise-to-image GAN to generate a pruned GAN by removing a subset of channels from the noise-to-image GAN;
   generate a distilled GAN from the pruned GAN by learning one or more parameters for the distilled GAN that cause the distilled GAN to generate an output that mimics an output of the noise-to-image GAN utilizing at least one knowledge distillation loss between:

a foreground mask from an image generated utilizing the noise-to-image GAN; and an additional foreground mask from an additional image generated utilizing the pruned GAN.

10. The system of claim 9, wherein the one or more processors are configured to cause the system to select the subset of channels comprising the outgoing channel weights that do not exceed the a threshold outgoing channel weight, wherein the outgoing channel weights comprise outgoing L1 -norms for the outgoing channel weights of channels from set of channels.

11. The system of claim 9, wherein the at least one knowledge distillation loss comprises a combination of a norm-based knowledge distillation loss and a perceptual knowledge distillation loss from comparing the image generated of utilizing the noise-to-image GAN and the additional image generated utilizing the pruned GAN.

12. The system of claim 9, wherein the one or more processors are configured to cause the system to learn the one or more parameters of the distilled GAN until the at least one knowledge distillation loss satisfies a threshold knowledge distillation loss, the threshold knowledge distillation loss indicating that the output of the distilled GAN mimics the output of the noise-to-image GAN.

13. The system of claim 10, wherein the one or more processors are configured to cause the system to determine gradients for the outgoing channel weights corresponding to the subset of channels by backpropagating, within the noise-to-image GAN, a differentiable loss from between a particular image generated utilizing the noise-to-image GAN and a foreground-modified image corresponding to the particular image to prune channels of the noise-to-image GAN based on the gradient for the outgoing channel weights.

14. A computer-implemented method comprising:
modifying a foreground region of an image generated from a noise-to-image generative adversarial neural network (GAN) to generate a foreground-modified image;
generating a pruned GAN by pruning channels of the noise-to-image GAN based on gradients for outgoing channel weights corresponding to the channels upon a backpropagation of a differentiable loss between the image and the foreground-modified image within the noise-to-image GAN;
utilizing the pruned GAN to generate an additional image; and
generating a distilled GAN from the pruned GAN by learning parameters for the distilled GAN that cause outputs of the distilled GAN to mimic outputs of the noise-to-image GAN by utilizing at least one knowledge distillation loss between a foreground mask from the image and an additional foreground mask from the additional image.

15. The computer-implemented method of claim 14, further comprising modifying the foreground region of the image to generate the foreground-modified image by applying noise pixels within the foreground region of the image.

16. The computer-implemented method of claim 15, further comprising parsing a face depicted within the image as the foreground region of the image.

17. The computer-implemented method of claim 14, further comprising:
comparing the image and the foreground-modified image to determine the differentiable loss between the image and the foreground-modified image;
backpropagating the differentiable loss within the noise-to-image GAN to identify the gradients for the outgoing channel weights corresponding to the channels of the noise-to-image GAN; and
pruning the channels of the noise-to-image GAN by removing one or more channels corresponding to the gradients of the outgoing channel weights that do not satisfy a threshold gradient, the threshold gradient indicating channel sensitivity to the foreground-modified image.

18. The computer-implemented method of claim 14, further comprising determining the at least one knowledge distillation loss by comparing the foreground mask from the image and the additional foreground mask from the additional image.

19. The computer-implemented method of claim 14, further comprising learning parameters for the distilled GAN utilizing a combination of a norm-based knowledge distillation loss between the foreground mask from the image and the additional foreground mask from the additional image and a perceptual knowledge distillation loss between the foreground mask from the image and the additional foreground mask from the additional image.

20. The computer-implemented method of claim 19, further comprising learning parameters for the distilled GAN utilizing a GAN minimax loss from the additional image generated by the pruned GAN.

* * * * *